(12) United States Patent
Usoro et al.

(10) Patent No.: US 6,709,359 B2
(45) Date of Patent: *Mar. 23, 2004

(54) FAMILY OF MULTI-SPEED TRANSMISSION MECHANISMS HAVING THREE PLANETARY GEAR SETS AND FIVE TORQUE-TRANSMITTING MECHANISMS

(75) Inventors: Patrick Benedict Usoro, Troy, MI (US); Chi-Kuan Kao, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/010,375

(22) Filed: Nov. 5, 2001

(65) Prior Publication Data

US 2003/0087719 A1 May 8, 2003

(51) Int. Cl.$^7$ ............................. F16H 3/62; F16H 3/44
(52) U.S. Cl. ..................... 475/276; 475/296; 475/280
(58) Field of Search .................... 475/271, 275–292, 475/296, 297

(56) References Cited

U.S. PATENT DOCUMENTS

| | | | | |
|---|---|---|---|---|
| 4,007,648 A | * | 2/1977 | Bookout | 475/285 |
| 4,070,927 A | | 1/1978 | Polak | 74/765 |
| 5,106,352 A | | 4/1992 | Lepelletier | 475/280 |
| 5,122,103 A | * | 6/1992 | Nakawaki et al. | 475/278 |
| 5,599,251 A | | 2/1997 | Beim et al. | 475/275 |
| 5,700,218 A | * | 12/1997 | VanSelous et al. | 475/12 |
| 5,755,636 A | * | 5/1998 | Justice et al. | 475/275 |
| 5,772,552 A | * | 6/1998 | Ibaraki et al. | 475/281 |
| 6,071,208 A | | 6/2000 | Koivunen | 475/275 |
| 6,083,135 A | | 7/2000 | Baldwin et al. | 475/276 |
| 6,217,474 B1 | * | 4/2001 | Ross et al. | 475/269 |
| 6,342,026 B1 | * | 1/2002 | Takagi et al. | 475/276 |
| 6,364,804 B1 | * | 4/2002 | Haka | 475/278 |
| 6,422,968 B1 | * | 7/2002 | Coffey | 475/275 |
| 6,422,969 B1 | * | 7/2002 | Raghavan et al. | 475/276 |
| 6,425,841 B1 | * | 7/2002 | Haka | 475/275 |
| 6,468,179 B1 | * | 10/2002 | Mathis et al. | 475/280 |

FOREIGN PATENT DOCUMENTS

EP          1033510          9/2000

* cited by examiner

Primary Examiner—Tisha D Lewis
(74) Attorney, Agent, or Firm—Kathryn A. Marra

(57) ABSTRACT

The family of transmissions has a plurality of members that can be utilized in powertrains to provide at least six forward speed ratios and one reverse speed ratio. The transmission family members include three planetary gear sets and five torque transmitting mechanisms. The powertrain includes an engine and torque converter that is continuously connected to at least one member of the planetary gear arrangement and an output member that is continuously connected with another of the planetary gear members. At least one other planetary gear member is continuously connected with the transmission housing. The five torque transmitting mechanisms provide interconnections between various gear members and with the transmission housing, the input or output shaft, in some instances, and are operated in combinations of two to establish at least six forward speed ratios.

7 Claims, 12 Drawing Sheets

| | RATIOS | 50 | 52 | 54 | 56 | 58 |
|---|---|---|---|---|---|---|
| REVERSE | -3.47 | | X | X | | |
| NEUTRAL | 0 | | X | | | |
| 1 | 3.86 | | X | | | X |
| 2 | 2.13 | X | | | | X |
| 3 | 1.42 | | | X | | X |
| 4 | 1 | | | | X | X |
| 5 | 0.73 | | | X | X | |
| 6 | 0.6 | X | | | X | |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 2.52$, $\frac{R_3}{S_3} = 1.53$

| RATIO SPREAD | 6.38 |
|---|---|
| RATIO STEPS | |
| REV/1 | -0.9 |
| 1/2 | 1.81 |
| 2/3 | 1.5 |
| 3/4 | 1.42 |
| 4/5 | 1.36 |
| 5/6 | 1.21 |

| | RATIOS | 150 | 152 | 154 | 156 | 158 |
|---|---|---|---|---|---|---|
| REVERSE | -4.16 | | X | X | | |
| NEUTRAL | 0 | | X | | | |
| 1 | 4.6 | | X | | X | |
| 2 | 2.42 | X | | | X | |
| 3 | 1.59 | | | X | X | |
| 4 | 1 | | | | X | X |
| 5 | 0.71 | | | X | | X |
| 6 | 0.6 | X | | | | X |

(X = ENGAGED CLUTCH)

$\frac{\text{RING GEAR}}{\text{SUN GEAR}}$ TOOTH RATIO: $\frac{R_1}{S_1} = 2.33$, $\frac{R_2}{S_2} = 3.00$, $\frac{R_3}{S_3} = 1.53$

| RATIO SPREAD | 7.6 |
|---|---|
| RATIO STEPS | |
| REV/1 | -0.9 |
| 1/2 | 1.9 |
| 2/3 | 1.52 |
| 3/4 | 1.59 |
| 4/5 | 1.41 |
| 5/6 | 1.17 |

| | RATIOS | 250 | 252 | 254 | 256 | 258 |
|---|---|---|---|---|---|---|
| REVERSE | -2.16 | | X | | X | |
| NEUTRAL | 0 | | | | | |
| 1 | 4.32 | X | | | | X |
| 2 | 2.16 | | X | | | X |
| 3 | 1.44 | | | | X | X |
| 4 | 1 | | | X | | X |
| 5 | 0.83 | | | X | X | |
| 6 | 0.65 | | X | X | | |

(X = ENGAGED CLUTCH)

$\frac{\text{RING GEAR}}{\text{SUN GEAR}}$ TOOTH RATIO: $\frac{R_1}{S_1} = 2.30$, $\frac{R_2}{S_2} = 2.01$, $\frac{R_3}{S_3} = 2.98$

| RATIO SPREAD | 6.64 |
|---|---|
| RATIO STEPS | |
| REV/1 | -0.5 |
| 1/2 | 2 |
| 2/3 | 1.51 |
| 3/4 | 1.44 |
| 4/5 | 1.2 |
| 5/6 | 1.28 |

| | RATIOS | 350 | 352 | 354 | 356 | 358 |
|---|---|---|---|---|---|---|
| REVERSE | -2.98 | X | | | | X |
| NEUTRAL | 0 | X | | | | |
| 1 | 4.73 | X | | X | | |
| 2 | 3 | | X | X | | |
| 3 | 1.9 | | | X | | X |
| 4 | 1.43 | | | X | X | |
| 5 | 1 | | | | X | X |
| 6 | 0.75 | | X | | X | |

(X = ENGAGED CLUTCH)

$\frac{\text{RING GEAR}}{\text{SUN GEAR}}$ TOOTH RATIO: $\frac{R_1}{S_1} = 2.33$, $\frac{R_2}{S_2} = 2.31$, $\frac{R_3}{S_3} = 2.98$

| RATIO SPREAD | 6.31 |
|---|---|
| RATIO STEPS | |
| REV/1 | -0.63 |
| 1/2 | 1.58 |
| 2/3 | 1.58 |
| 3/4 | 1.33 |
| 4/5 | 1.43 |
| 5/6 | 1.34 |

| | RATIOS | 450 | 452 | 454 | 456 | 458 |
|---|---|---|---|---|---|---|
| REVERSE | -2.35 | | X | | X | |
| NEUTRAL | 0 | | X | | | |
| 1 | 3.94 | | X | | | X |
| 2 | 2.48 | X | | | | X |
| 3 | 1.54 | | | | X | X |
| 4 | 1.16 | | | X | | X |
| 5 | 0.81 | | | X | X | |
| 6 | 0.6 | X | | X | | |

(X = ENGAGED CLUTCH)

$\frac{\text{RING GEAR}}{\text{SUN GEAR}}$ TOOTH RATIO: $\frac{R_1}{S_1} = 1.87, \frac{R_2}{S_2} = 1.68, \frac{R_3}{S_3} = 1.53$

| RATIO SPREAD | 6.51 |
|---|---|
| RATIO STEPS | |
| REV/1 | -0.6 |
| 1/2 | 1.58 |
| 2/3 | 1.62 |
| 3/4 | 1.33 |
| 4/5 | 1.42 |
| 5/6 | 1.35 |

| | RATIOS | 550 | 552 | 554 | 556 | 558 |
|---|---|---|---|---|---|---|
| REVERSE | -1.85 | X | | | X | |
| NEUTRAL | 0 | X | | | | |
| 1 | 3.39 | X | | | | X |
| 2 | 1.84 | | X | | | X |
| 3 | 1 | | | | X | X |
| 4 | 0.77 | | | X | | X |
| 5 | 0.6 | | | X | X | |
| 6 | 0.45 | | X | X | | |

(X = ENGAGED CLUTCH)

$\frac{\text{RING GEAR}}{\text{SUN GEAR}}$ TOOTH RATIO: $\frac{R_1}{S_1} = 2.30$, $\frac{R_2}{S_2} = 1.83$, $\frac{R_3}{S_3} = 1.85$

| RATIO SPREAD | 7.49 |
|---|---|
| RATIO STEPS | |
| REV/1 | -0.55 |
| 1/2 | 1.84 |
| 2/3 | 1.84 |
| 3/4 | 1.31 |
| 4/5 | 1.28 |
| 5/6 | 1.32 |

| | RATIOS | 650 | 652 | 654 | 656 | 658 |
|---|---|---|---|---|---|---|
| REVERSE | -2.98 | X | | | X | |
| NEUTRAL | 0 | X | | | | |
| 1 | 3.01 | X | | | | X |
| 2 | 1.51 | | X | | | X |
| 3 | 1 | | | | X | X |
| 4 | 0.74 | | | X | | X |
| 5 | 0.58 | | | X | X | |
| 6 | 0.49 | | X | X | | |

(X = ENGAGED CLUTCH)

$\dfrac{\text{RING GEAR}}{\text{SUN GEAR}}$ TOOTH RATIO: $\dfrac{R_1}{S_1} = 1.87$, $\dfrac{R_2}{S_2} = 2.01$, $\dfrac{R_3}{S_3} = 2.98$

| RATIO SPREAD | 6.17 |
|---|---|
| RATIO STEPS | |
| REV/1 | -0.99 |
| 1/2 | 2 |
| 2/3 | 1.51 |
| 3/4 | 1.36 |
| 4/5 | 1.26 |
| 5/6 | 1.2 |

| | RATIOS | 750 | 752 | 754 | 756 | 758 |
|---|---|---|---|---|---|---|
| REVERSE | -3.26 | | X | X | | |
| NEUTRAL | 0 | | X | | | |
| 1 | 3.77 | | X | | X | |
| 2 | 2.05 | X | | | X | |
| 3 | 1.34 | | | X | X | |
| 4 | 1 | | | | X | X |
| 5 | 0.77 | | | X | | X |
| 6 | 0.62 | X | | | | X |

(X = ENGAGED CLUTCH)

$\frac{\text{RING GEAR}}{\text{SUN GEAR}}$ TOOTH RATIO: $\frac{R_1}{S_1} = 1.50, \frac{R_2}{S_2} = 1.88, \frac{R_3}{S_3} = 1.85$

| RATIO SPREAD | 7.7 |
|---|---|
| RATIO STEPS | |
| REV/1 | -0.53 |
| 1/2 | 1.86 |
| 2/3 | 1.87 |
| 3/4 | 1.31 |
| 4/5 | 1.28 |
| 5/6 | 1.32 |

|  | RATIOS | 850 | 852 | 854 | 856 | 858 |
|---|---|---|---|---|---|---|
| REVERSE | -2.32 | X |  |  |  | X |
| NEUTRAL | 0 | X |  |  |  |  |
| 1 | 2.58 | X |  |  | X |  |
| 2 | 1.48 |  | X |  | X |  |
| 3 | 1 |  |  |  | X | X |
| 4 | 0.7 |  |  | X | X |  |
| 5 | 0.5 |  |  | X |  | X |
| 6 | 0.41 |  | X | X |  |  |

(X = ENGAGED CLUTCH)

$\dfrac{\text{RING GEAR}}{\text{SUN GEAR}}$ TOOTH RATIO: $\dfrac{R_1}{S_1} = 2.33$, $\dfrac{R_2}{S_2} = 1.58$, $\dfrac{R_3}{S_3} = 2.32$

| RATIO SPREAD | 6.27 |
|---|---|
| RATIO STEPS |  |
| REV/1 | -0.9 |
| 1/2 | 1.75 |
| 2/3 | 1.48 |
| 3/4 | 1.43 |
| 4/5 | 1.4 |
| 5/6 | 1.22 |

| | RATIOS | 950 | 952 | 954 | 956 | 958 |
|---|---|---|---|---|---|---|
| REVERSE | -1.51 | X | | | X | |
| NEUTRAL | 0 | X | | | | |
| 1 | 2.76 | X | | | | X |
| 2 | 1.7 | | X | | | X |
| 3 | 1 | | | | X | X |
| 4 | 0.75 | | | X | | X |
| 5 | 0.53 | | | X | X | |
| 6 | 0.39 | | X | X | | |

(X = ENGAGED CLUTCH)

$\frac{\text{RING GEAR}}{\text{SUN GEAR}}$ TOOTH RATIO: $\frac{R_1}{S_1} = 1.87$, $\frac{R_2}{S_2} = 1.83$, $\frac{R_3}{S_3} = 1.51$

| RATIO SPREAD | 7.05 |
|---|---|
| RATIO STEPS | |
| REV/1 | -0.55 |
| 1/2 | 1.62 |
| 2/3 | 1.7 |
| 3/4 | 1.34 |
| 4/5 | 1.41 |
| 5/6 | 1.35 |

| | RATIOS | 1050 | 1052 | 1054 | 1056 | 1058 |
|---|---|---|---|---|---|---|
| REVERSE | -2.34 | X | | | X | |
| NEUTRAL | 0 | X | | | | |
| 1 | 2.68 | X | | | | X |
| 2 | 1.5 | | X | | | X |
| 3 | 1 | | | | X | X |
| 4 | 0.72 | | | X | | X |
| 5 | 0.52 | | | X | X | |
| 6 | 0.43 | | X | X | | |

(X = ENGAGED CLUTCH)

$\dfrac{\text{RING GEAR}}{\text{SUN GEAR}}$ TOOTH RATIO: $\dfrac{R_1}{S_1} = 1.57$, $\dfrac{R_2}{S_2} = 1.68$, $\dfrac{R_3}{S_3} = 2.34$

| RATIO SPREAD | 6.24 |
|---|---|
| RATIO STEPS | |
| REV/1 | -0.88 |
| 1/2 | 1.78 |
| 2/3 | 1.5 |
| 3/4 | 1.4 |
| 4/5 | 1.36 |
| 5/6 | 1.22 |

| | RATIOS | 1150 | 1152 | 1154 | 1156 | 1158 |
|---|---|---|---|---|---|---|
| REVERSE | -3.74 | | X | | X | |
| NEUTRAL | 0 | | | | X | |
| 1 | 3.93 | | | | X | X |
| 2 | 1.94 | | X | | | X |
| 3 | 1 | | | X | | X |
| 4 | 0.8 | | X | X | | |
| 5 | 0.66 | X | | X | | |
| 6 | 0.56 | | | X | X | |

(X = ENGAGED CLUTCH)

$\frac{\text{RING GEAR}}{\text{SUN GEAR}}$ TOOTH RATIO: $\frac{R_1}{S_1} = 2.93$, $\frac{R_2}{S_2} = 1.97$, $\frac{R_3}{S_3} = 1.93$

| RATIO SPREAD | 7 |
|---|---|
| RATIO STEPS | |
| REV/1 | -0.95 |
| 1/2 | 2.03 |
| 2/3 | 1.94 |
| 3/4 | 1.25 |
| 4/5 | 1.21 |
| 5/6 | 1.18 |

FAMILY OF MULTI-SPEED TRANSMISSION MECHANISMS HAVING THREE PLANETARY GEAR SETS AND FIVE TORQUE-TRANSMITTING MECHANISMS

BACKGROUND OF THE INVENTION

1. Field of the Invention

The present invention relates to a family of power transmissions having three planetary gear sets that are controlled by five torque-transmitting devices to provide at least six forward speed ratios and one reverse speed ratio.

2. Background Art

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions, such as Polak, having six or more forward gear ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

SUMMARY OF THE INVENTION

It is an object of the present invention to provide an improved family of transmissions having three planetary gear sets controlled to provide at least six forward speed ratios.

In one aspect of the present invention, the family of transmissions has three planetary gear sets, each of which includes a first, second and third member, which members may comprise a sun gear, a ring gear, or a planet carrier assembly member.

In another aspect of the present invention, each of the planetary gear sets may be of the single pinion-type or of the double pinion-type.

In yet another aspect of the present invention, the first member of the first planetary gear set is continuously interconnected to the first member of the second planetary gear set through a first interconnecting member.

In still another aspect of the invention, a second interconnecting member continuously interconnects the second member of the second planetary gear set with the first member of the third planetary gear set.

In yet still another aspect of the invention, a second member of the first planetary gear set is continuously connected to a stationary transmission member, such as a housing or transmission case.

In yet a further aspect of the invention, each family member incorporates an input shaft which is continuously interconnected with at least one member of the planetary gear sets and an output shaft which is continuously connected with another member of the planetary gear sets.

In still a further aspect of the invention, a first torque-transmitting mechanism, such as a brake, selectively interconnects the stationary transmission housing with a member of the second or third planetary gear sets.

In another aspect of the invention, a second torque-transmitting mechanism, such as a brake, selectively interconnects the stationary transmission housing with the first interconnecting member, the second interconnecting member or a member of the second or third planetary gear sets.

In a still further aspect of the invention, a third torque-transmitting mechanism, such as a clutch, selectively interconnects a member of the first planetary gear set with the input shaft, the output shaft, or a member of the second or third planetary gear sets.

In a still further aspect of the invention, a fourth torque-transmitting mechanism, such as a clutch, selectively interconnects a member of the second planetary gear set with the input shaft, the output shaft, the first interconnecting member, the second interconnecting member, or a member of the first or third planetary gear sets.

In still another aspect of the invention, a fifth torque-transmitting mechanism, such as a clutch, selectively interconnects a member of the first, second or third planetary gear sets with the input shaft, the output shaft, or another member of the first, second or third planetary gear sets.

In still another aspect of the invention, the five torque-transmitting mechanisms are selectively engageable in combinations of two to yield at least six forward speed ratios and one reverse speed ratio.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart of some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention; and FIG. 12b is a truth table and chart depicting some of the operating characteristics of the powertrain shown in FIG. 12a.

DETAILED DESCRIPTION OF THE PREFERRED EMBODIMENTS

Figures 1A, 1B:
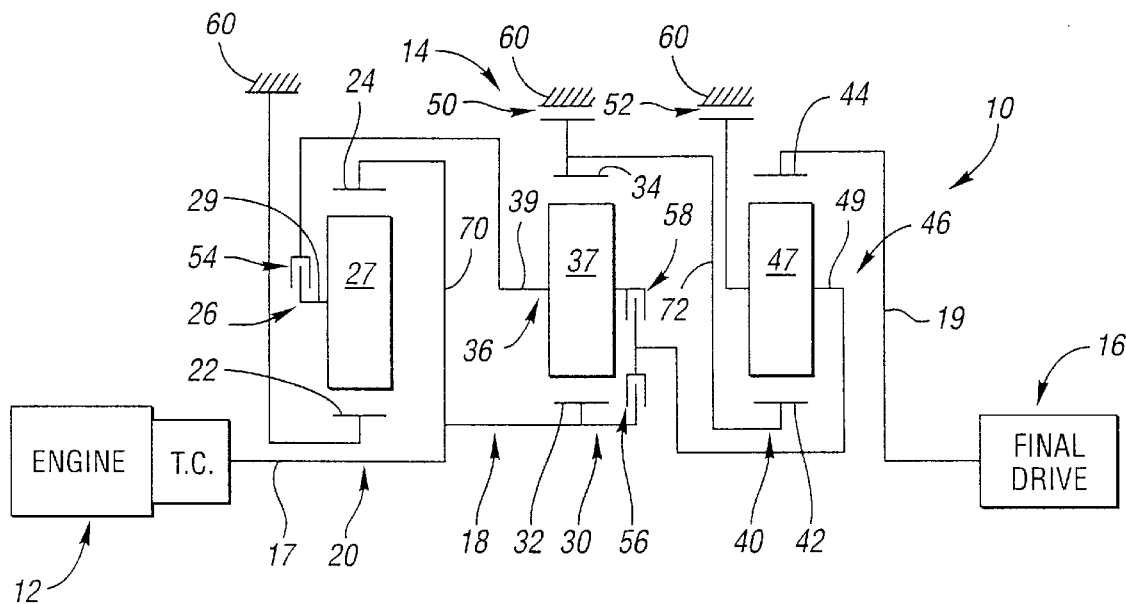

Referring to the drawings, wherein like characters represent the same or corresponding parts throughout the several views, there is shown in FIG. 1a a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement also includes five torque-transmitting mechanisms 50, 52, 54, 56 and 58. The torque-transmitting mechanisms 50 and 52 are stationary-type torque-transmitting mechanisms, commonly termed brakes or reaction clutches. The torque-transmitting mechanisms 54, 56 and 58 are of the rotating-type torque-transmitting mechanisms, commonly termed clutches.

The input shaft 17 is continuously connected with the sun gear member 32, and the output shaft 19 is continuously connected with the ring gear member 44. A first interconnecting member 70 continuously interconnects the ring gear member 24 with the sun gear member 32.

A second interconnecting member 72 continuously interconnects the ring gear member 34 with the sun gear member 42. The sun gear member 22 is continuously connected with the transmission housing 60.

The ring gear member 34 is selectively connectable with the transmission housing 60 through the torque-transmitting mechanism 50. The planet carrier assembly member 46 is selectively connectable with the transmission housing 60 through the torque-transmitting mechanism 52.

The planet carrier assembly member 26 is selectively connectable with the planet carrier assembly member 36 to the torque-transmitting mechanism 54. The sun gear member 32 is selectively connectable with the planet carrier assembly member 46 through the torque-transmitting mechanism 56. The planet carrier assembly member 36 is selectively connectable with the planet carrier assembly member 46 through the torque-transmitting mechanism 58.

As shown in FIG. 1*b*, and in particular the truth table disclosed therein, the torque-transmitting mechanisms are selectively engaged in combinations of two to provide six forward speed ratios and a reverse speed ratio. It should also be noted in the truth table that the torque-transmitting mechanism 52 remains engaged through a neutral condition, thereby simplifying the forward/reverse interchange.

To establish the reverse speed ratio, the torque-transmitting mechanisms 52 and 54 are engaged. The engagement of torque-transmitting mechanism 52 holds the planet carrier assembly member 46 to the transmission housing 60, and the engagement of the torque-transmitting mechanism 54 holds the planet carrier assembly member 26 to the planet carrier assembly member 36. Accordingly, the planet carrier assembly member 26 will be driven at the same speed as the planet carrier assembly member 36. The ring gear member 24 will be driven at the same speed as the input shaft, which is also equal to the speed of the sun gear member 32. The ring gear member 34 will be driven at a speed determined by the speed of the planet carrier assembly member 36, the speed of the sun gear member 32, and the ring gear/sun gear tooth ratio of the planetary gear set 30. The sun gear member 42 will be driven at the same speed as the ring gear member 34. The planet carrier assembly member 46 is fixed to the transmission housing and therefore not rotating. The speed of the ring gear member 44, and therefore the output shaft 19, will be determined by the speed of the sun gear member 42 and the ring gear/sun gear tooth ratio of the planetary gear set 40. The overall numerical value of the reverse ratio is determined by the tooth ratios of the planetary gear sets 20, 30 and 40.

The first forward speed ratio is established with the engagement of the torque-transmitting mechanisms 52 and 58. With the torque-transmitting mechanism 52 engaged, the planet carrier assembly member 46 is connected to the transmission housing 60. With the torque-transmitting mechanism 58 engaged, the planet carrier assembly 36 is connected to the planet carrier assembly member 46, and therefore not rotating. In this configuration, the speed of the ring gear member 24 is equal to the input shaft speed. The sun gear member 32 rotates at the same speed as the ring gear member 24. The speed of the ring gear member 34 is determined by the speed of the sun gear member 32, and the ring gear/sun gear tooth ratio of the planetary gear set 30. The ring gear member 44, and therefore the output shaft 19, is driven at a speed determined by the speed of the sun gear member 42, which is the same as the speed of the ring gear member 34, and the ring gear/sun gear tooth ratio of the planetary gear set 40. The overall numerical value of the first forward speed ratio is determined by the tooth ratios of the planetary gear sets 30 and 40.

The second forward speed ratio is established when the torque-transmitting mechanisms 50 and 58 are engaged. With the torque-transmitting mechanism 50 engaged, the ring gear member 34 and the interconnecting member 72 are connected to the transmission housing 60. With the torque-transmitting mechanism 58 engaged, the planet carrier assembly member 36 is connected to the planet carrier assembly member 46. In this configuration, the speed of the ring gear member 24 is the same as the input shaft speed. The sun gear member 32 rotates at the same speed as the ring gear member 24. The ring gear member 34 does not rotate. The planet carrier assembly member 36 rotates at the same speed as the planet carrier assembly member 46. The speed of the planet carrier assembly member 36 is determined by the speed of the sun gear member 32 and the ring gear/sun gear tooth ratio of the planetary gear set 30. The ring gear member 44, and therefore the output shaft 19, is driven at a speed determined by the speed of the planet carrier assembly member 46 and the ring gear/sun gear tooth ratio of the planetary gear set 40. The overall numerical value of the second forward speed ratio is determined by the tooth ratios of planetary gear sets 30 and 40.

The third forward speed ratio is established with the engagement of the torque-transmitting mechanisms 54 and 58. With the torque-transmitting mechanism 54 engaged, the planet carrier assembly member 26 is connected to the planet carrier assembly member 36. With the torque-transmitting mechanism 58 engaged, the planet carrier assembly member 36 is connected to the planet carrier assembly member 46. In this configuration, the planet carrier assembly members 26, 36 and 46 all rotate at the same speed. The ring gear member 24 rotates at the same speed as the input shaft. The planet carrier assembly member 36 rotates at a speed determined by the speed of the ring gear member 34, the speed of the sun gear member 32, which is the same as the speed of the ring gear member 24, and the ring gear/sun gear tooth ratio of the planetary gear set 30. The output shaft 19 rotates at the same speed as the ring gear member 44, which is determined by the speed of the planet carrier assembly member 46, the speed of the sun gear member 42, which is the same as the speed of the ring gear member 34, and the ring gear/sun gear tooth ratio of the planetary gear set 40. The overall numerical value of the third forward speed ratio is determined by the tooth ratios of the planetary gear sets 20, 30 and 40.

The fourth forward speed ratio is established with the engagement of the torque-transmitting mechanisms 56 and 58. In this configuration, the planetary gear sets 30 and 40 are locked together and rotating at the same speed as the input shaft 19. The ring gear member 44, and therefore the output shaft 19, therefore rotates at the same speed as the input shaft 17. The numerical value of the fourth forward speed ratio is 1.

The fifth forward speed ratio is established with the engagement of the torque-transmitting mechanisms 54 and 56. With the torque-transmitting mechanism 54 engaged, the planet carrier assembly member 26 is connected to the planet carrier assembly member 36. With the torque-transmitting mechanism 56 engaged, the sun gear member 32 is connected to the planet carrier assembly member 46. In this configuration, the planet carrier assembly member 26 rotates at the same speed as the planet carrier assembly member 36. The ring gear member 24 rotates at the same speed as the sun gear member 32. The planet carrier assembly member 26 rotates at a speed determined by the speed of the ring gear member 24, and the ring gear/sun gear tooth ratio of the planetary gear set 20. The ring gear member 34 rotates at the same speed as the sun gear member 42. The planet carrier assembly member 36 rotates at a speed determined by the speed of the ring gear member 34, the speed of the sun gear member 32, and the ring gear/sun gear tooth ratio of the planetary gear set 30. The ring gear member 44, and therefore the output shaft 19, rotates at a speed determined by the speed of the planet carrier assembly member 46, which is the same as the speed of the sun gear member 32, the speed of the sun gear member 42, and the ring gear/sun gear tooth ratio of the planetary gear set 40. The numerical value of the fifth forward speed ratio is determined by the ring gear/sun gear tooth ratios of the planetary gear sets 20, 30 and 40.

The sixth forward speed ratio is established with the engagement of the torque-transmitting mechanisms 50 and 56. With the torque-transmitting mechanism 50 engaged, the ring gear member 34 is connected to the transmission housing 60 and not rotating. With the torque-transmitting mechanism 56 engaged, the sun gear member 32 is connected to the planet carrier assembly member 46. The speed of the ring gear member 24 is the same as the input shaft speed. The sun gear member 32 is driven at the same speed as the ring gear member 24. The sun gear member 42 is not rotating. The ring gear member 44, and therefore the output shaft 19, is driven at a speed determined by the speed of the planet carrier assembly member 46 and the ring gear/sun gear tooth ratio of the planetary gear set 40. The overall numeric value of the sixth forward speed ratio is determined by the tooth ratio of the planetary gear set 40.

As set forth above, the engagement schedules for the torque-transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1b describes the ratio steps that are attained utilizing the sample of tooth ratios given. For example, the step ratio between the first and second forward speed ratios is 1.81, while the step ratio between the reverse and first forward ratio is −0.9. It can also be readily determined from the truth table of FIG. 1b that all of the single step forward ratio interchanges are of the single transition variety, as are the double step forward ratio interchanges.

Figures 2A, 2B:
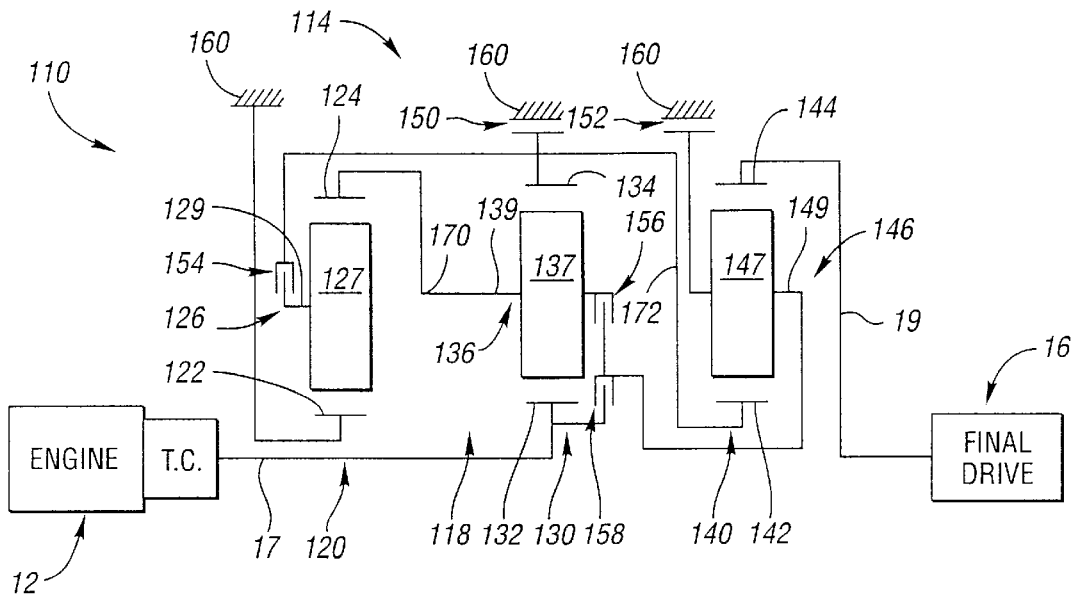

FIG. 2a shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes five torque-transmitting mechanisms 150, 152, 154, 156 and 158. The torque-transmitting mechanisms 150 and 152 are stationary-type torque-transmitting mechanisms, commonly termed brakes or reaction clutches. The torque-transmitting mechanisms 154, 156 and 158 are of the rotating-type torque-transmitting mechanisms, commonly termed "clutches."

The input shaft 17 is continuously connected with the sun gear member 132, and the output shaft 19 is continuously connected with the ring gear member 144. The sun gear member 122 is continuously connected with the transmission housing 160. The ring gear member 124 is continuously connected with the planet carrier assembly member 136 by the interconnecting member 170. The sun gear member 142 is continuously connected with the ring gear member 134 by the interconnecting member 172.

The ring gear member 134 is selectively connectable with the transmission housing 160 through the torque-transmitting mechanism 150. The planet carrier assembly member 146 is selectively connectable with the transmission housing 160 through the torque-transmitting mechanism 152. The planet carrier assembly member 126 is selectively connectable with the ring gear member 134 through the torque-transmitting mechanism 154. The planet carrier assembly member 136 is selectively connectable with the planet carrier assembly member 146 through the torque-transmitting mechanism 156. The sun gear member 132 is selectively connectable with the planet carrier assembly member 146 through the torque-transmitting mechanism 158.

The truth table of FIG. 2b describes the engagement sequence utilized to provide six forward speed ratios and a reverse speed ratio in the planetary gear arrangement 118 shown in FIG. 2a.

To establish the reverse speed ratio, the torque-transmitting mechanisms 152 and 154 are engaged. With the torque-transmitting mechanism 152 engaged, the planet carrier assembly member 146 is connected to the transmission housing 160. With the torque-transmitting member 154 engaged, the planet carrier assembly member 126 is connected to the ring gear member 134. In this configuration, the planet carrier assembly member 126 rotates at the same speed as the ring gear member 134. This speed is determined by the speed of the ring gear member 124 and the ring gear/sun gear tooth ratio of the planetary gear set 120. The sun gear member 132 is driven at the same speed as the input shaft. The planet carrier assembly member 136 is driven at the same speed as the ring gear member 124. The speed of the planet carrier assembly member 136 is determined by the speed of the ring gear member 134, the speed of the sun gear member 132, and the ring gear/sun gear tooth ratio of the planetary gear set 130. The sun gear member 142 is driven at the same speed as the ring gear member 134. The planet carrier assembly member 146 is connected to the transmission housing 160. The ring gear member 144, and therefore the output shaft 19, is driven at a speed determined by the speed of the sun gear member 142 and the ring gear/sun gear tooth ratio of the planetary gear set 140. The overall numerical value of the reverse speed ratio is determined by the tooth ratios of the planetary gear sets 120, 130 and 140.

The first forward speed ratio is established with the engagement of the torque-transmitting mechanisms 152 and 156. In this configuration, the planet carrier assembly member 146 is connected to the transmission housing 160 by the torque-transmitting mechanism 152, and the planet carrier assembly member 136 is connected to the planet carrier assembly member 146 by the torque-transmitting mechanism 156. The ring gear member 124, the planet carrier assembly member 136, and the planet carrier assembly member 146 do not rotate. The ring gear member 134 rotates at the same speed as the sun gear member 142. The ring gear member 134 rotates at a speed determined by the speed of the sun gear member 132, which is the same as the input shaft speed, and the ring gear/sun gear tooth ratio of the planetary gear set 130. The ring gear member 144, and therefore the output shaft 19, rotates at a speed determined by the speed of the sun gear member 142 and the ring gear/sun gear tooth ratio of the planetary gear set 140. The overall numerical value of the first forward speed is determined by the tooth ratios of the planetary gear sets 130 and 140.

The second forward speed ratio is established with the engagement of the torque-transmitting mechanisms 150 and 156. The torque-transmitting mechanism 150 connects the ring gear member 134 with the transmission housing 160. The torque-transmitting mechanism 156 connects the planet carrier assembly member 136 with the planet carrier assembly member 146. The ring gear member 124 rotates at the same speed as the planet carrier assembly member 136 and the planet carrier assembly member 146. The ring gear member 134 and sun gear member 142 are fixed to the transmission housing 160, and the sun gear member 132 rotates at the same speed as the input shaft. The planet carrier assembly member 136 rotates at a speed determined by the speed of the sun gear member 132 and the ring gear/sun gear tooth ratio of the planetary gear set 130. The ring gear member 144, and therefore the output shaft 19, rotates at a speed determined by the speed of the planet carrier assembly member 146, and the ring gear/sun gear tooth ratio of the planetary gear set 140. The overall numerical value of the second forward speed ratio is determined by the tooth ratios of the planetary gear sets 130 and 140.

The third forward speed ratio is established with the engagement of the torque-transmitting mechanisms 154 and 156. The torque-transmitting mechanism 154 engages the planet carrier assembly member 126 with the ring gear member 134. The torque-transmitting mechanism 156 engages the planet carrier assembly member 136 with the planet carrier assembly member 146. The ring gear member 124 rotates at the same speed as the planet carrier assembly member 136 and the planet carrier assembly member 146. The planet carrier assembly member 126 rotates at the same speed as the ring gear member 134. The planet carrier assembly member 126 rotates at a speed determined by the speed of the ring gear member 124 and the ring gear/sun gear tooth ratio of planetary gear set 120. The sun gear member 132 rotates at the same speed as the input shaft 17, and the ring gear member 134 rotates at the same speed as the sun gear member 142. The planet carrier assembly member 136 rotates at a speed determined by the speed of the ring gear member 134, the speed of the sun gear member 132, and the ring gear/sun gear tooth ratio of the planetary gear set 130. The ring gear member 144, and therefore the output shaft 19, rotates at a speed determined by the speed of the planet carrier assembly member 146, the speed of the sun gear member 142, and the ring gear/sun gear tooth ratio of the planetary gear set 140. The overall numerical value of the third forward speed ratio is determined by the tooth ratios of the planetary gear sets 120, 130 and 140.

The fourth forward speed ratio is established with the engagement of the torque-transmitting mechanisms 156 and 158. This combination of engagements effectively connects the input shaft 17 directly with the output shaft 19 such that the fourth forward speed ratio is a direct drive or 1:1 ratio.

The fifth forward speed ratio is established with the engagement of the torque-transmitting mechanisms 154 and 158. The torque-transmitting mechanism 154 connects the planet carrier assembly member 126 with the ring gear member 134. The torque-transmitting mechanism 158 connects the sun gear member 132 with the planet carrier assembly member 146. The ring gear member 124 rotates at the same speed as the planet carrier assembly member 136. The planet carrier assembly member 126 rotates at the same speed as the ring gear member 134. The planet carrier assembly member 126 rotates at a speed determined by the speed of the ring gear member 124 and the ring gear/sun gear tooth ratio of the planetary gear set 120. The sun gear member 132 rotates at the same speed as the input shaft 17. The ring gear member 134 rotates at the same speed as the sun gear member 142. The planet carrier assembly member 136 rotates at a speed determined by the speed of the ring gear member 134, the speed of the sun gear member 132 and the ring gear/sun gear tooth ratio of the planetary gear set 130. The ring gear member 144, and therefore the output shaft 19, rotates at a speed determined by the speed of the planet carrier assembly member 146, the speed of the sun gear member 142, and the ring gear/sun gear tooth ratio of the planetary gear set 140. The overall numerical value of the fifth forward speed ratio is determined by the tooth ratios of the planetary gear sets 120, 130 and 140.

The sixth forward speed ratio is established with the engagement of the torque-transmitting mechanisms 150 and 158. The torque-transmitting mechanism 150 connects the ring gear member 134 with the transmission housing 160. The torque-transmitting mechanism 158 connects the sun gear member 132 with the planet carrier assembly member 146. The ring gear member 134 and sun gear member 142 do not rotate. The sun gear member 132 rotates at the same speed as the input shaft 17 and the planet carrier assembly member 146. The ring gear member 144, and therefore the output shaft 19, rotates at a speed determined by the speed of the planet carrier assembly member 146 and the ring gear/sun gear tooth ratio of the planetary gear set 140. The overall numerical value of the sixth forward speed ratio is determined by the tooth ratio of the planetary gear set 140.

As set forth above, the truth table of FIG. 2b describes the engagement sequence of the torque-transmitting mechanisms utilized to provide a reverse drive ratio and six forward speed ratios. It can be readily determined from the truth table that all of the single step forward interchanges are of the single transition type, as are the double step forward interchanges. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2b are the ratio steps between single step ratios in the forward direction as well as the reverse to first ratio step ratio. For example, the first to second step ratio is 1.9.

Figures 3A, 3B:
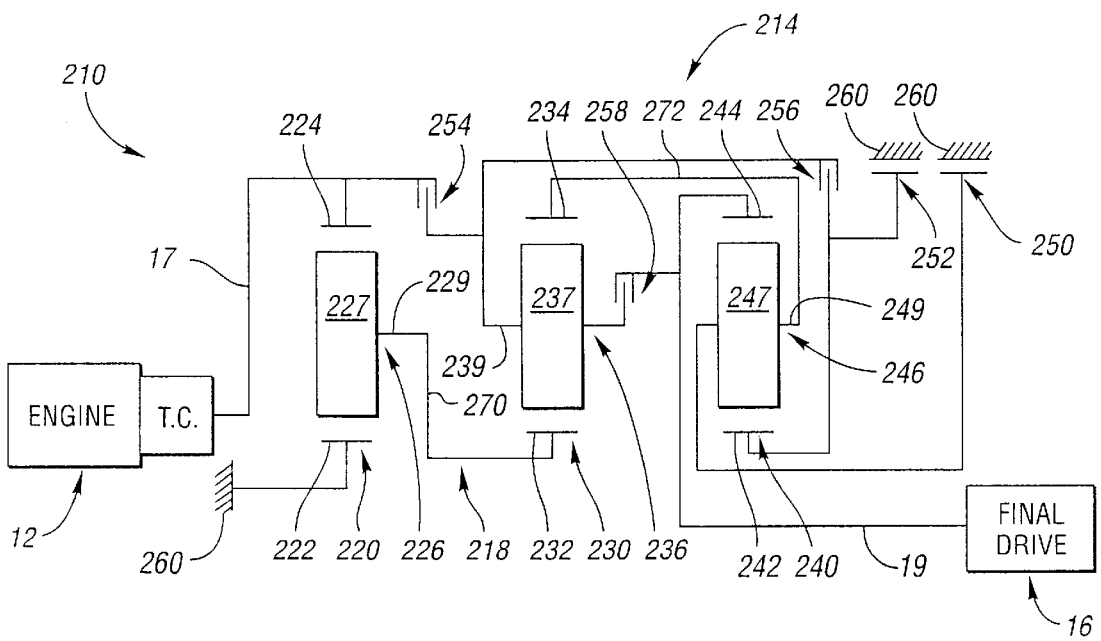

Turning to FIG. 3a, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes five torque-transmitting mechanisms 250, 252, 254, 256 and 258. The torque-transmitting mechanisms 250 and 252 are stationary type torque-transmitting mechanisms, commonly termed brakes or reaction clutches. The torque-transmitting mechanisms 254, 256 and 258 are of the rotating type torque-transmitting mechanisms, commonly termed clutches.

The input shaft 17 is continuously connected with the ring gear member 224, and the output shaft 19 is continuously connected with the ring gear member 244. The sun gear member 222 is continuously connected with the transmission housing 260. The planet carrier assembly member 226 is continuously connected with the sun gear member 232 through the interconnecting member 270. The ring gear member 234 is continuously connected with the planet carrier assembly member 246 through the interconnecting member 272.

The torque-transmitting mechanism 250 selectively connects the planet carrier assembly member 246 with the transmission housing 260. The torque-transmitting mechanism 252 selectively connects the sun gear member 242 with the transmission housing 260. The torque-transmitting mechanism 254 selectively connects the ring gear member 224 with the planet carrier assembly member 236. The torque-transmitting mechanism 256 selectively connects the sun gear member 242 with the planet carrier assembly member 236. The torque-transmitting mechanism 258 selectively connects the planet carrier assembly member 236 with the ring gear member 244.

As shown in the truth table in FIG. 3b, the torque-transmitting mechanisms are engaged in combinations of two to establish six forward speed ratios and one reverse ratio.

To establish the reverse speed ratio, the torque-transmitting mechanisms 252 and 256 are engaged. The torque-transmitting mechanism 252 connects the sun gear member 242 with the transmission housing 260. The torque-transmitting mechanism 256 connects the sun gear member 242 with the planet carrier assembly member 236. The ring gear member 224 rotates at the same speed as the input shaft. The planet carrier assembly member 226 rotates at the same speed as the sun gear member 232. The planet carrier assembly member 226 rotates at a speed determined by the speed of the ring gear member 224 and the ring gear/sun gear tooth ratio of the planetary gear set 220. The ring gear member 234 rotates at the same speed as the planet carrier assembly member 246. The planet carrier assembly member 236 and the sun gear member 242 do not rotate. The ring gear member 234 rotates at a speed determined by the speed of the sun gear member 232 and the ring gear/sun gear tooth ratio of the planetary gear set 230. The ring gear member 244, and therefore the output shaft 19, rotates at a speed determined by the speed of the planet carrier assembly member 246 and the ring gear/sun gear tooth ratio of the planetary gear set 240. The overall numerical value of the reverse speed ratio is determined by the ring gear/sun gear tooth ratios of the planetary gear set 220, 230 and 240.

To establish the first forward speed ratio, the torque-transmitting mechanisms 250 and 258 are engaged. The torque-transmitting mechanism 250 connects the planet carrier assembly member 246 to the transmission housing 260. The torque-transmitting mechanism 258 connects the planet carrier assembly member 236 to the ring gear member 244. The ring gear member 224 rotates at the same speed as the input shaft 17. The planet carrier assembly member 226 rotates at the same speed as the sun gear member 232. In this configuration, the planet carrier assembly member 226 rotates at a speed determined by the speed of the ring gear member 224 and the ring gear/sun gear tooth ratio of the planetary gear set 220. The ring gear member 234 and the planet carrier assembly member 246 do not rotate. The planet carrier assembly member 236 rotates at the same speed as the ring gear member 244. The planet carrier assembly member 236, and therefore the output shaft 19, rotates at a speed determined by the speed of the sun gear member 232 and the ring gear/sun gear tooth ratio of the planetary gear set 230. The overall numerical value of the first forward speed ratio is determined by the tooth ratios of the planetary gear sets 220 and 230.

The second forward speed ratio is established with the engagement of the torque-transmitting mechanisms 252 and 258. The torque-transmitting mechanism 252 connects the sun gear member 242 to the transmission housing 260. The torque-transmitting mechanism 258 connects the planet carrier assembly member 236 to the ring gear member 244. The planet carrier assembly member 226 rotates at the same speed as the sun gear member 232. The ring gear member 224 rotates at the same speed as the input shaft 17. In this configuration, the planet carrier assembly member 226 rotates at a speed determined by the speed of the ring gear member 224 and the ring gear/sun gear tooth ratio of the planetary gear set 220. The ring gear member 234 rotates at the same speed as the planet carrier assembly member 246. The planet carrier assembly member 236 rotates at the same speed as the ring gear member 244. The planet carrier assembly member 236 rotates at a speed determined by the speed of the ring gear member 234, the speed of the sun gear member 232, and the ring gear/sun gear tooth ratio of the planetary gear set 230. The ring gear member 244, and therefore the output shaft 19, rotates at a speed determined by the speed of the planet carrier assembly member 246 and the ring gear/sun gear tooth ratio of the planetary gear set 240. The overall numerical value of the second forward speed ratio is determined by the tooth ratios of the planetary gear sets 220, 230 and 240.

The third forward speed ratio is established with the engagement of the torque-transmitting mechanisms 256 and 258. The torque-transmitting mechanism 256 connects the sun gear member 242 to the planet carrier assembly member 236. The torque-transmitting mechanism 258 connects the planet carrier assembly member 236 to the ring gear member 244. The ring gear member 224 rotates at the same speed as the input shaft 17, and the planet carrier assembly member 226 rotates at the same speed as the sun gear member 232. In this configuration, the planet carrier assembly member 226 rotates at a speed determined by the speed of the ring gear member 224 and the ring gear/sun gear tooth ratio of the planetary gear set 220. The planetary gear sets 230 and 240 are locked and rotate together at the same speed, which is equal to the speed of the planet carrier assembly member 226. The overall numerical value of the third forward speed ratio is determined by the tooth ratio of the planetary gear set 220.

The fourth forward speed ratio is established with the engagement of the torque-transmitting mechanisms 254 and 258. With this combination of engagements, the input shaft 17 and the output shaft 19 rotate in unison and therefore the fourth forward speed ratio is a direct drive or 1:1 ratio.

The fifth forward speed ratio is established with the engagement of the torque-transmitting mechanisms 254 and 256. In this configuration, the torque-transmitting mechanism 254 connects the ring gear member 224 with the planet carrier assembly member 236, and the torque-transmitting mechanism 256 connects the sun gear member 242 with the planet carrier assembly member 236. The ring gear member 224 rotates at the same speed as the input shaft 17, which is the same as the speed of the planet carrier assembly member 236 and the speed of the sun gear member 242. The planet carrier assembly member 226 rotates at the same speed as the sun gear member 232. The planet carrier assembly member 226 rotates at a speed determined by the speed of the ring gear member 224 and the ring gear/sun gear tooth ratio of the planetary gear set 220. The ring gear member 234 rotates at the same speed as the planet carrier assembly member 246. The ring gear member 234 rotates at a speed determined by the speed of the planet carrier assembly member 236, the speed of the sun gear member 232, and the ring gear/sun gear tooth ratio of the planetary gear set 230. The ring gear member 244, and therefore the output shaft 19, rotates at a speed determined by the speed of the planet carrier assembly member 246, the speed of the sun gear member 242, and the ring gear/sun gear tooth ratio of the planetary gear set 240. The overall numerical value of the fifth forward speed ratio is determined by the tooth ratios of the planetary gear sets 220, 230 and 240.

The sixth forward speed ratio is established with the engagement of the torque-transmitting mechanisms 252 and 254. In this configuration, the torque-transmitting mechanism 252 connects the sun gear member 242 with the transmission housing 260, and the torque-transmitting mechanism 254 connects the ring gear member 224 with the planet carrier assembly member 236. The ring gear member 224 rotates at the same speed as the input shaft 17, which is equal to the speed of the planet carrier assembly member 236. The planet carrier assembly member 226 rotates at the same speed as the sun gear member 232. The planet carrier assembly member 226 rotates at a speed determined by the speed of the ring gear member 224 and the ring gear/sun gear tooth ratio of the planetary gear set 220. The ring gear member 234 rotates at the same speed as the planet carrier assembly member 246. The ring gear member 234 rotates at a speed determined by the speed of the planet carrier assembly member 236, the speed of the sun gear member 232, and the ring gear/sun gear tooth ratio of the planetary gear set 230. The ring gear member 244, and therefore the output shaft 19, rotates at a speed determined by the speed of the planet carrier assembly member 246 and the ring gear/sun gear tooth ratio of the planetary gear set 240. The overall numerical value of the sixth forward speed ratio is determined by the tooth ratios of the planetary gear sets 220, 230 and 240.

As previously set forth, the truth table of FIG. 3b describes the combinations of engagements utilized for the six forward speed ratios and reverse ratio. The truth table also provides an example of speed ratios that are available with the family member described above. These examples of speed ratios are determined utilizing the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse speed ratio. For example, the first to second ratio interchange has a step of 2. It can also be readily determined from the truth table of FIG. 3b that all of the single step forward ratio interchanges are of the single transition variety, as are all of the double step forward interchanges.

Figures 4A, 4B:
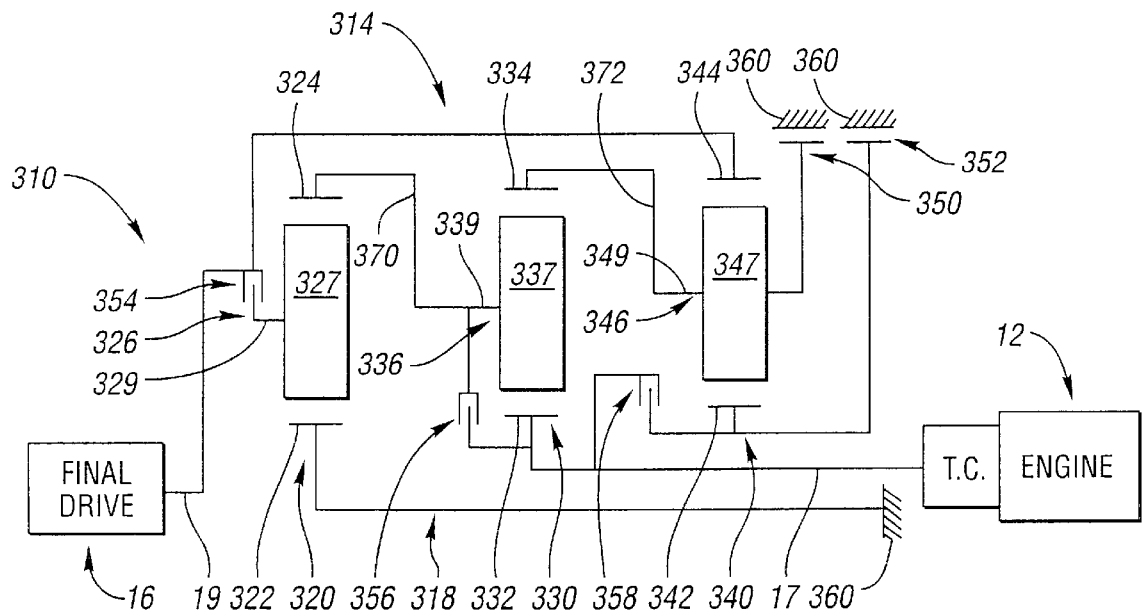

A powertrain 310, shown in FIG. 4a, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes five torque-transmitting mechanisms 350, 352, 354, 356 and 358. The torque-transmitting mechanisms 350 and 352 are stationary type torque-transmitting mechanisms, commonly termed brakes or reaction clutches. The torque-transmitting mechanisms 354, 356 and 358 are of the rotating type torque-transmitting mechanisms, commonly termed clutches.

The input shaft 17 is continuously connected with the sun gear member 332, the output shaft 19 is continuously connected with the ring gear member 344, and the sun gear member 322 is continuously connected with the transmission housing 360. The ring gear member 324 is continuously connected with the planet carrier assembly member 336 through the interconnecting member 370. The ring gear member 334 is continuously connected with the planet carrier assembly member 346 through the interconnecting member 372.

The planet carrier assembly member 346 is selectively connectable with the transmission housing 360 through the torque-transmitting mechanism 350. The sun gear member 342 is selectively connectable with the transmission housing 360 through the torque-transmitting mechanism 352. The planet carrier assembly member 326 is selectively connectable with the ring gear member 344 through the torque-transmitting mechanism 354. The planet carrier assembly member 336 is selectively connectable with the sun gear member 332 through the torque-transmitting mechanism 356. The sun gear member 342 is selectively connectable with the sun gear member 332 through the torque-transmitting mechanism 358.

The truth tables given in FIGS. 4b, 5b, 6b, 7b, 8b, 9b, 10b, 11b and 12b show the engagement sequences for the torque-transmitting mechanisms to provide at least six forward speed ratios and one reverse ratio. As shown and described above for the configuration in FIGS. 1a, 2a and 3a, those skilled in the art will understand from the respective truth tables how the speed ratios are established through the planetary gear sets identified in the written description.

The truth table shown in FIG. 4b describes the engagement combination and the engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 1.58. It can be readily determined from the truth table of FIG. 4b that each of the forward single step ratio interchanges is a single transition shift, as are the double step interchanges. The chart also shows that the torque-transmitting mechanism 350 can be engaged through the neutral condition to simplify the forward/reverse interchange.

Those skilled in the art will recognize that the numerical values of the reverse and sixth forward speed ratios are determined utilizing the ring gear/sun gear tooth ratio of the planetary gear set 340. The numerical value of the first forward speed ratio is determined utilizing the ring gear/sun gear tooth ratio of the planetary gear sets 320 and 330. The numerical values of the second and third forward speed ratios are determined utilizing the ring gear/sun gear tooth ratio of all three planetary gear sets 320, 330 and 340. The numerical value of the fourth forward speed ratio is determined utilizing the ring gear/sun gear tooth ratio of the planetary gear set 320. The fifth forward speed ratio is a 1:1 or direct drive.

Figures 5A, 5B:
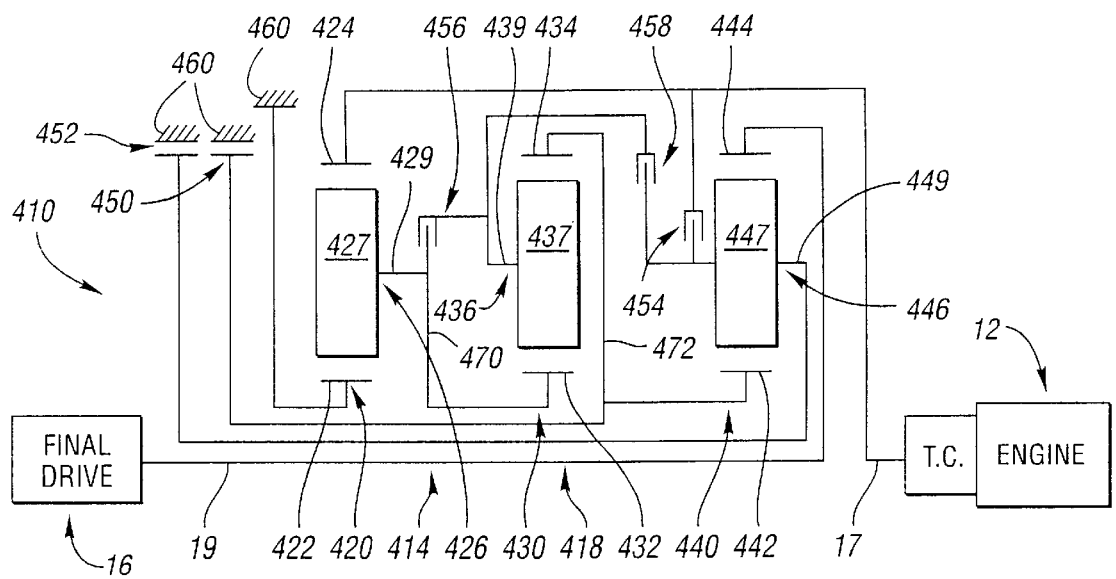

A powertrain 410, shown in FIG. 5a, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes five torque-transmitting mechanisms 450, 452, 454, 456 and 458. The torque-transmitting mechanisms 450 and 452 are stationary-type torque-transmitting mechanisms, commonly termed brakes or reaction clutches. The torque-transmitting mechanisms 454, 456 and 458 are of the rotating-type torque-transmitting mechanisms, commonly termed clutches.

The input shaft 17 is continuously connected with the ring gear member 424, the output shaft 19 is continuously connected with the ring gear member 444, and the sun gear member 422 is continuously connected with the transmission housing 460. The planet carrier assembly member 426 is continuously connected with the sun gear member 432 through the interconnecting member 470, and the sun gear member 442 is continuously connected with the ring gear member 434 through the interconnecting member 472.

The ring gear member 434 and interconnecting member 472 are selectively connectable with the transmission housing through the torque-transmitting mechanism 450. The planet carrier assembly member 446 is selectively connectable with the transmission housing 460 through the torque-transmitting mechanism 452. The planet carrier assembly member 446 is selectively connectable with the ring gear member 424 through the torque-transmitting mechanism 454. The planet carrier assembly member 426 and interconnecting member 470 are selectively connectable with the planet carrier assembly member 436 through the torque-transmitting member 456. The planet carrier assembly member 436 is selectively connectable with the planet carrier assembly member 446 through the torque-transmitting mechanism 458.

The truth table shown in FIG. 5b describes the engagement combination and sequence of the torque-transmitting mechanisms 450, 452, 454, 456 and 458 that are employed to provide the reverse drive ratio and the six forward speed ratios. It should be noted that the torque-transmitting mechanism 452 is engaged through the neutral condition to simplify the forward/reverse interchange.

Also given in the truth table of FIG. 5b is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440. As can also be determined from the truth table of FIG. 5b, the single step forward interchanges are single transition shifts, as are the double step interchanges in the forward direction.

FIG. 5b also provides a chart of the ratio steps between adjacent forward ratios and between the reverse and first forward ratio. For example, the ratio step between the first and second forward ratios is 1.58. Those skilled in the art will recognize that the numerical value of the reverse and fifth speed ratios are determined utilizing the tooth ratios of the planetary gear sets 420 and 440. The numerical values of the first, second and fourth forward speed ratios are determined utilizing the ring gear/sun gear tooth ratios of the planetary gear sets 420, 430 and 440. The numerical value of the third forward speed ratio is determined utilizing the ring gear/sun gear tooth ratio of the planetary gear set 420. The numerical value of the sixth forward speed ratio is determined utilizing the ring gear/sun gear tooth ratio of the planetary gear set 440.

Figures 6A, 6B:
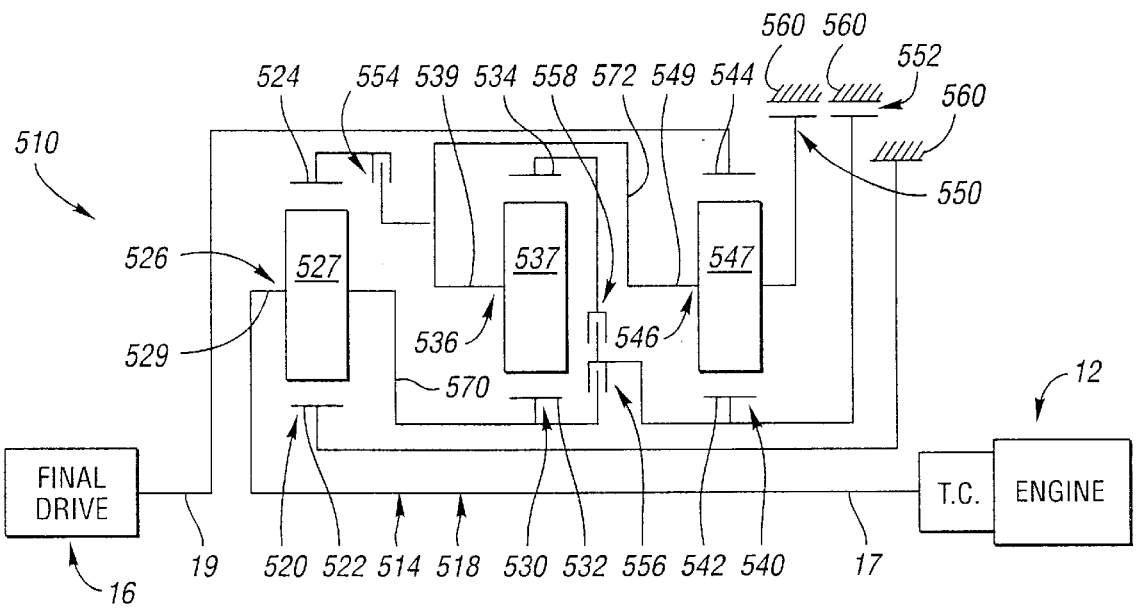

A powertrain 510, shown in FIG. 6*a*, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes five torque-transmitting mechanisms 550, 552, 554, 556 and 558. The torque-transmitting mechanisms 550 and 552 are stationary-type torque-transmitting mechanisms, commonly termed brakes or reaction clutches. The torque-transmitting mechanisms 554, 556 and 558 are rotating-type torque-transmitting mechanisms, commonly termed clutches.

The input shaft 17 is continuously connected with the planet carrier assembly member 526, the output shaft 19 is continuously connected with the ring gear member 544, and the sun gear member 522 is continuously connected with the transmission housing 560. The planet carrier assembly member 526 is continuously connected with the sun gear member 532 through the interconnecting member 570. The planet carrier assembly member 536 is continuously connected with the planet carrier assembly member 546 through the interconnecting member 572.

The planet carrier assembly member 546 is selectively connectable with the transmission housing 560 through the torque-transmitting mechanism 550. The sun gear member 542 is selectively connectable with the transmission housing 560 through the torque-transmitting mechanism 552. The ring gear member 524 is selectively connectable with the planet carrier assembly member 536 and the interconnecting member 572 through the torque-transmitting mechanism 554. The sun gear member 532 is selectively connectable with the sun gear member 542 through the torque-transmitting mechanism 556. The ring gear member 534 is selectively connectable with the sun gear member 542 through the torque-transmitting mechanism 558.

The truth table shown in FIG. 6*b* describes the engagement sequence and combination of the torque-transmitting mechanisms to provide the reverse speed ratio and six forward speed ratios. It should be noted that the torque-transmitting mechanism 550 can remain engaged through the neutral condition, thereby simplifying the forward/reverse interchange. It can also be determined from the truth table of FIG. 6*b* that all of the single step forward ratio interchanges are of the single transition variety, as are all of the double step forward interchanges. The chart of FIG. 6*b* describes the ratio steps between adjacent forward speed ratios and the ratio step between the reverse and first forward speed ratio.

Those skilled in the art, upon reviewing the truth table and the schematic representation of FIG. 6*a*, can determine that the numerical value of the reverse speed ratio is determined by the ring gear/sun gear tooth ratio of the planetary gear set 540. The numerical value of the first and second forward speed ratios are determined by the tooth ratios of the planetary gear sets 530 and 540. The third forward speed ratio is a 1:1 or direct drive connection. The numerical value of the fourth forward speed ratio is determined by the tooth ratios of the planetary gear sets 520, 530 and 540. The numerical values of the fifth and sixth forward speed ratios are determined by the tooth ratios of the planetary gear sets 520 and 540.

The sample speed ratios given in the truth table are determined utilizing the tooth ratio values also given in FIG. 6*b*. The R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
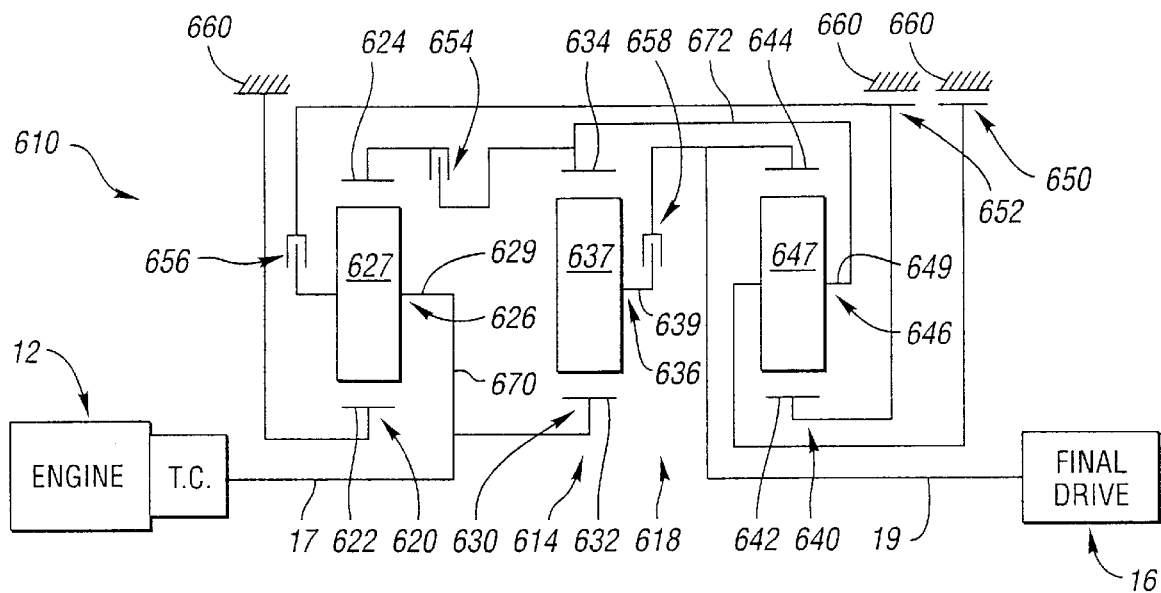

A powertrain 610, shown in FIG. 7*a*, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes five torque-transmitting mechanisms 650, 652, 654, 656 and 658. The torque-transmitting mechanisms 650 and 652 are stationary-type torque-transmitting mechanisms, commonly termed brakes or reaction clutches. The torque-transmitting mechanisms 654, 656 and 658 are of the rotating-type torque-transmitting mechanisms, commonly termed clutches.

The input shaft 17 is continuously connected with the planet carrier assembly member 626, the output shaft 19 is continuously connected with the ring gear member 644, and the sun gear member 622 is continuously connected with the transmission housing 660. The planet carrier assembly member 626 is continuously connected with the sun gear member 632 through the interconnecting member 670. The planet carrier assembly member 646 is continuously connected with the ring gear member 634 through the interconnecting member 672.

The planet carrier assembly member 646 is selectively connectable with the transmission housing 660 through the torque-transmitting mechanism 650. The sun gear member 642 is selectively connectable with the transmission housing 660 through the torque-transmitting mechanism 652. The ring gear member 624 is selectively connectable with the ring gear member 634 through the torque-transmitting mechanism 654. The planet carrier assembly member 626 is selectively connectable with the sun gear member 642 through the torque-transmitting mechanism 656. The planet carrier assembly member 636 is selectively connectable with the ring gear member 644 through the torque-transmitting mechanism 658.

The truth table shown in FIG. 7b describes the combination of torque-transmitting mechanism engagements that will provide the reverse drive ratio and six forward speed ratios, as well as the sequence of these engagements and interchanges. The torque-transmitting mechanism 650 can be engaged through the neutral condition, thereby simplifying the forward/reverse interchange. It can be noted from the truth table that each of the single step forward interchanges are single transition ratio changes, as are the double step forward interchanges.

The ratio values given are by way of example and are established utilizing the ring gear/sun gear tooth ratios given in FIG. 7b. For example, the R1/S1 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7b.

Those skilled in the art will, upon reviewing the truth table of FIG. 7b, recognize that the reverse ratio has a numerical value determined by the ring gear/sun gear tooth ratio of the planetary gear set 640. The numerical value of the first forward speed ratio is determined by the ring gear/sun gear tooth ratio of the planetary gear set 630. The numerical value of the second forward speed ratio is determined by the ring gear/sun gear tooth ratios of the planetary gear sets 630 and 640. The third forward speed ratio is a 1:1 or direct drive. The numerical value of the fourth forward speed ratio is determined by the ring gear/sun gear tooth ratios of the planetary gear sets 620 and 630. The numerical values of the fifth and sixth forward speed ratios are determined from the ring gear/sun gear tooth ratios of the planetary gear sets 620 and 640.

Figures 8A, 8B:
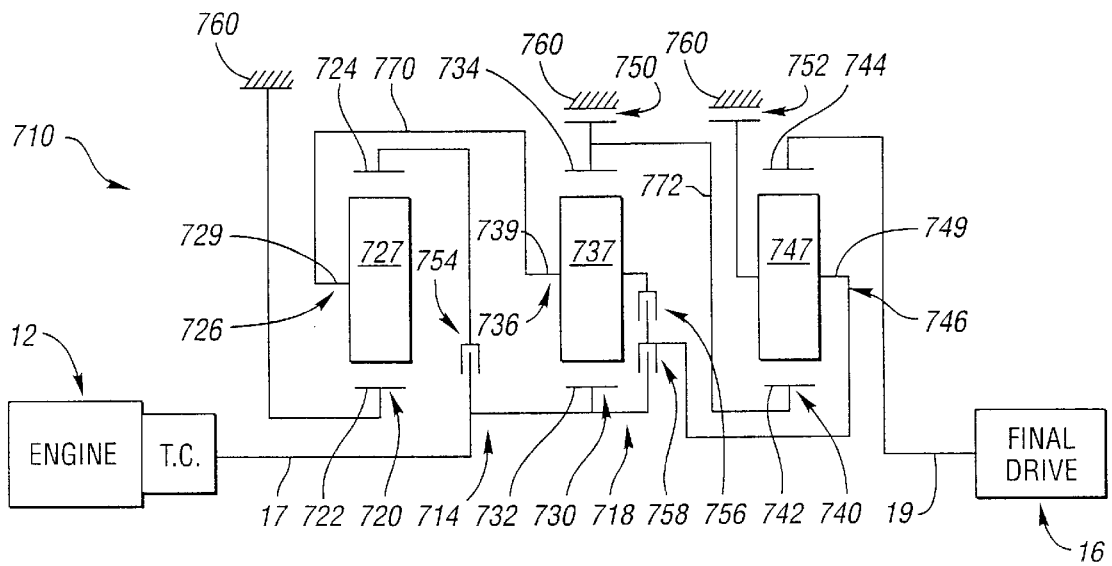

A powertrain 710, shown in FIG. 8a, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly 726. The planet carrier assembly 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes five torque-transmitting mechanisms 750, 752, 754, 756 and 758. The torque-transmitting mechanisms 750 and 752 are stationary-type torque-transmitting mechanisms, commonly termed brakes or reaction clutches. The torque-transmitting mechanisms 754, 756 and 758 are of the rotating-type torque-transmitting mechanisms, commonly termed clutches.

The input shaft 17 is continuously connected with the sun gear member 732, the output shaft 19 is continuously connected with the ring gear member 744, and the sun gear member 722 is continuously connected with the transmission housing 760. The planet carrier assembly member 726 is continuously connected with the planet carrier assembly member 736 through the interconnecting member 770. The ring gear member 734 is continuously connected with the sun gear member 742 through the interconnecting member 772.

The ring gear member 734 is selectively connectable with the transmission housing through the torque-transmitting mechanism 750. The planet carrier assembly member 746 is selectively connectable with the transmission housing 760 through the torque-transmitting mechanism 752. The ring gear member 724 is selectively connectable with the sun gear member 732 through the torque-transmitting mechanism 754. The planet carrier assembly member 736 is selectively connectable with the planet carrier assembly member 746 through the torque-transmitting mechanism 756. The sun gear member 732 is selectively connectable with the planet carrier assembly member 746 through the torque-transmitting mechanism 758.

The truth table of FIG. 8b defines the torque-transmitting mechanism engagement sequence utilized for each of the forward speed ratios and the reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; and the R3/S3 value is the tooth ratio of the planetary gear set 740. As can also be determined from the truth table of FIG. 8b, the single step forward interchanges are single transition shifts, as are the double step interchanges in the forward direction.

FIG. 8b also provides a chart of the ratio steps between adjacent forward ratios and between the reverse and first forward ratio. For example, the ratio step between the first and second forward ratios is 1.86. Those skilled in the art will recognize that the numerical value of the reverse and the third and fifth forward speed ratios are determined utilizing the tooth ratios of the planetary gear sets 720, 730 and 740. The numerical values of the first and second forward speed ratios are determined utilizing the ring gear/sun gear tooth ratios of the planetary gear sets 730 and 740. The fourth forward speed ratio is a 1:1 or direct drive. The sixth forward speed ratio has a numerical value determined utilizing the ring gear/sun gear tooth ratio of the planetary gear set 740.

Figures 9A, 9B:
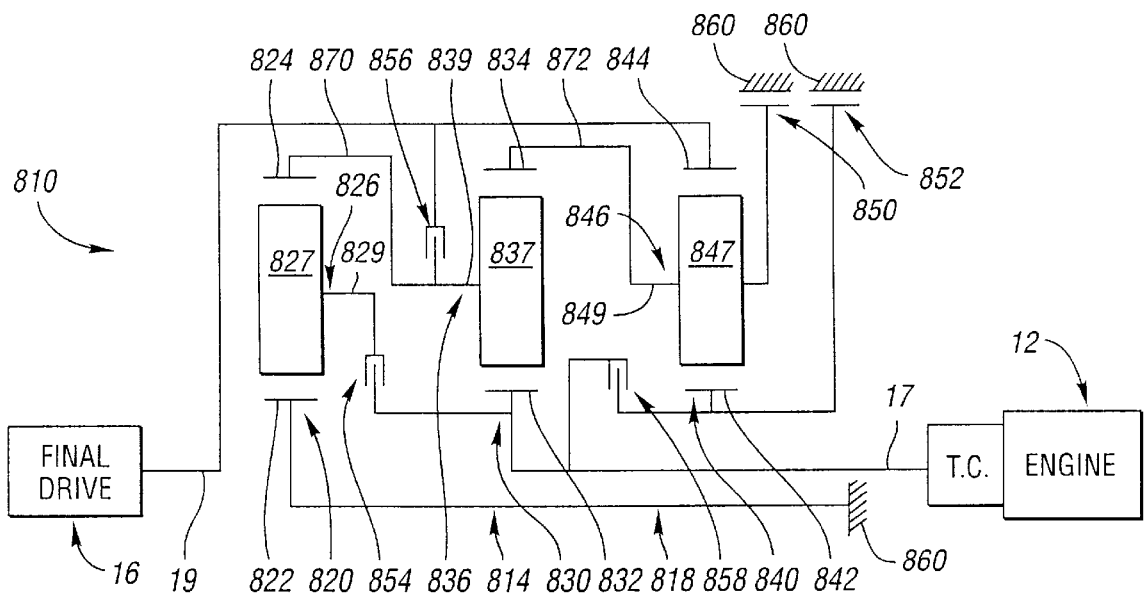

A powertrain 810, shown in FIG. 9*a*, has the conventional engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear arrangement 818 also includes five torque-transmitting mechanisms 850, 852, 854, 856 and 858. The torque-transmitting mechanisms 850 and 852 are stationary-type torque-transmitting mechanisms, commonly termed brakes or reaction clutches. The torque-transmitting mechanisms 854, 856 and 858 are of the rotating-type torque-transmitting mechanisms, commonly termed clutches.

The input shaft 17 is continuously connected with the sun gear member 832, the output shaft 19 is continuously connected with the ring gear member 844, and the sun gear member 822 is continuously connected with the transmission housing 860. The ring gear member 824 is continuously connected with the planet carrier assembly member 836 through the interconnecting member 870. The ring gear member 834 is continuously connected with the planet carrier assembly member 846 through the interconnecting member 872.

The planet carrier assembly member 846 is selectively connectable with the transmission housing 860 through the torque-transmitting mechanism 850. The sun gear member 842 is selectively connectable with the transmission housing 860 through the torque-transmitting mechanism 852. The planet carrier assembly member 826 is selectively connectable with the sun gear member 832 through the torque-transmitting mechanism 854. The planet carrier assembly member 836 is selectively connectable with the ring gear member 844 through the torque-transmitting mechanism 856. The sun gear member 832 is selectively connectable with the sun gear member 842 through the torque-transmitting mechanism 858.

The truth table shown in FIG. 9*b* defines the torque-transmitting mechanism engagement sequence that provides the reverse ratio and six forward speed ratios shown in the truth table and available with the planetary gear arrangement 818. The truth table indicates that the torque-transmitting mechanism 850 can remain engaged through the neutral condition, thereby simplifying the forward/reverse interchange. A sample of numerical values for the individual ratios is also given in the truth table of FIG. 9*b*. These numerical values have been calculated using the ring gear/sun gear tooth ratios also given by way of example in FIG. 9*b*. The R1/S1 value is the tooth ratio of the planetary gear set 820; the R2/S2 value is the tooth ratio of the planetary gear set 830; and the R3/S3 value is the tooth ratio of the planetary gear set 840. It can be readily recognized from the truth table that all of the single and double step forward interchanges are single transition ratio interchanges. FIG. 9*b* also describes the ratio steps between adjacent forward ratios and between the reverse and first forward ratio. For example, the ratio step between the first and second forward ratios is 1.75.

Those skilled in the art of planetary transmissions will recognize that the numerical value of the reverse speed ratio is determined by the ring gear/sun gear tooth ratio of the planetary gear set 840. The numerical value of the first forward speed ratio is determined from the ring gear/sun gear tooth ratio of the planetary gear set 830. The numerical value of the second forward speed ratio is determined from the ring gear/sun gear tooth ratios of the planetary gear sets 830 and 840. The third forward speed ratio is a direct drive or 1:1 ratio. The numerical value of the fourth forward speed ratio is determined utilizing the ring gear/sun gear tooth ratio of the planetary gear set 820. The numerical values of the fifth and sixth forward speed ratios are determined utilizing the ring gear/sun gear tooth ratios of the planetary gear sets 820, 830 and 840.

Figures 10A, 10B:
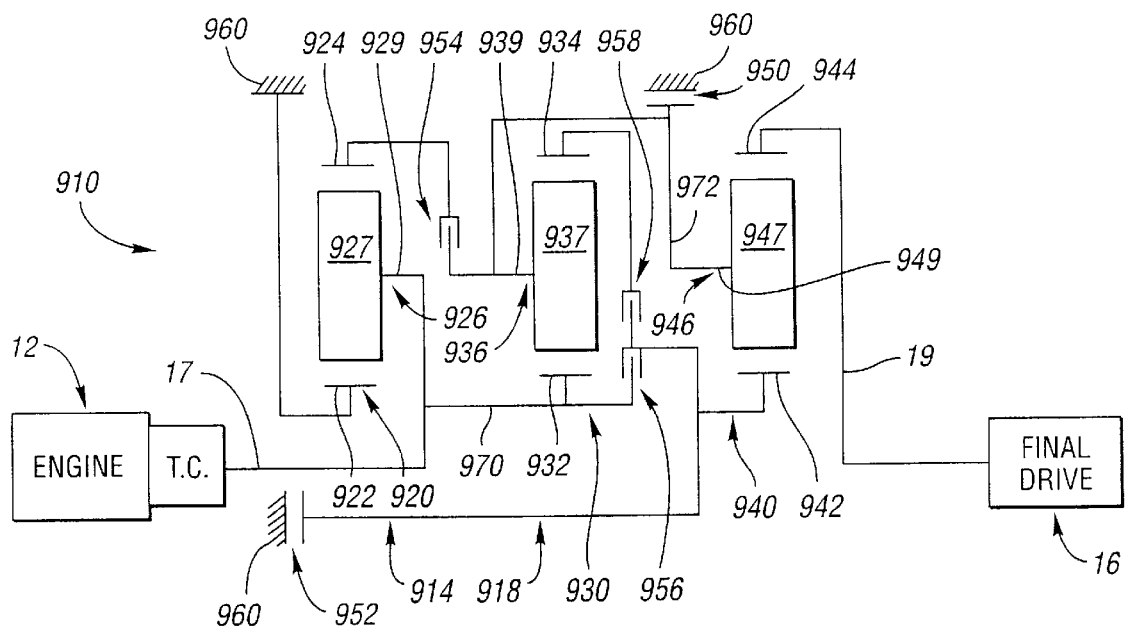

The powertrain 910, shown in FIG. 10*a*, includes the conventional engine and torque converter 12, a planetary transmission 914, and the conventional final drive mechanism 16. The engine and torque converter 12 are drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922, a ring gear member 924, and a planet carrier assembly 926. The planet carrier assembly 926 includes a plurality of pinion gears 927 that are rotatably mounted on a carrier member 929 and disposed in meshing relationship with the sun gear member 922 and the ring gear member 924, respectively.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the sun gear member 932 and the ring gear member 934.

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes five torque-transmitting mechanisms 950, 952, 954, 956 and 958. The torque-transmitting mechanisms 950 and 952 are stationary-type torque-transmitting mechanisms, commonly termed brakes or reaction clutches. The torque-transmitting mechanisms 954, 956 and 958 are of the rotating-type torque-transmitting mechanisms, commonly termed clutches.

The input shaft 17 is continuously connected with the planet carrier assembly member 926, the output shaft 19 is continuously connected with the ring gear member 944, and the sun gear member 922 is continuously connected with the transmission housing 960. The planet carrier assembly member 926 is continuously connected with the sun gear member 932 through the interconnecting member 970. The planet carrier assembly member 936 is continuously connected with the planet carrier assembly member 946 through the interconnecting member 972.

The interconnecting member 972 and planet carrier assembly member 946 are selectively connectable with the transmission housing 960 through the torque-transmitting mechanism 950. The sun gear member 942 is selectively connectable with the transmission housing 960 through the torque-transmitting mechanism 952. The ring gear member 924 is selectively connectable with the planet carrier assembly member 936 through the torque-transmitting mechanism 954. The sun gear member 932 is selectively connectable with the sun gear member 942 through the torque-transmitting mechanism 956. The ring gear member 934 is selectively connectable with the sun gear member 942 through the torque-transmitting mechanism 958.

The truth table of FIG. 10b describes the torque-transmitting mechanism engagement sequence utilized to provide the reverse speed ratio and six forward speed ratios. The truth table also provides a set of examples for the ratios for each of the reverse and forward speed ratios. These numerical values have been determined utilizing the ring gear/sun gear tooth ratios given in FIG. 10b. The R1/S1 value is the tooth ratio of the planetary gear set 920; the R2/S2 value is the tooth ratio of the planetary gear set 930; and the R3/S3 value is the tooth ratio of the planetary gear set 940. It can also be determined from the truth table of FIG. 10b that each of the forward single step ratio interchanges are of the single transition variety, as are the double step interchanges.

Those skilled in the art, upon reviewing the engagement combinations, will recognize that the numerical value of the reverse speed ratio is determined utilizing the tooth ratio of the planetary gear set 940. The numerical values of the first and second forward speed ratios are determined utilizing the ring gear/sun gear tooth ratios of the planetary gear sets 930 and 940. The third forward speed ratio is a direct drive or 1:1 ratio. The numerical value of the fourth forward speed ratio is determined utilizing the ring gear/sun gear tooth ratios of the planetary gear sets 920, 930 and 940. The numerical values of the fifth and sixth forward speed ratios are determined utilizing the ring gear/sun gear tooth ratios of the planetary gear sets 920 and 940.

Figures 11A, 11B:
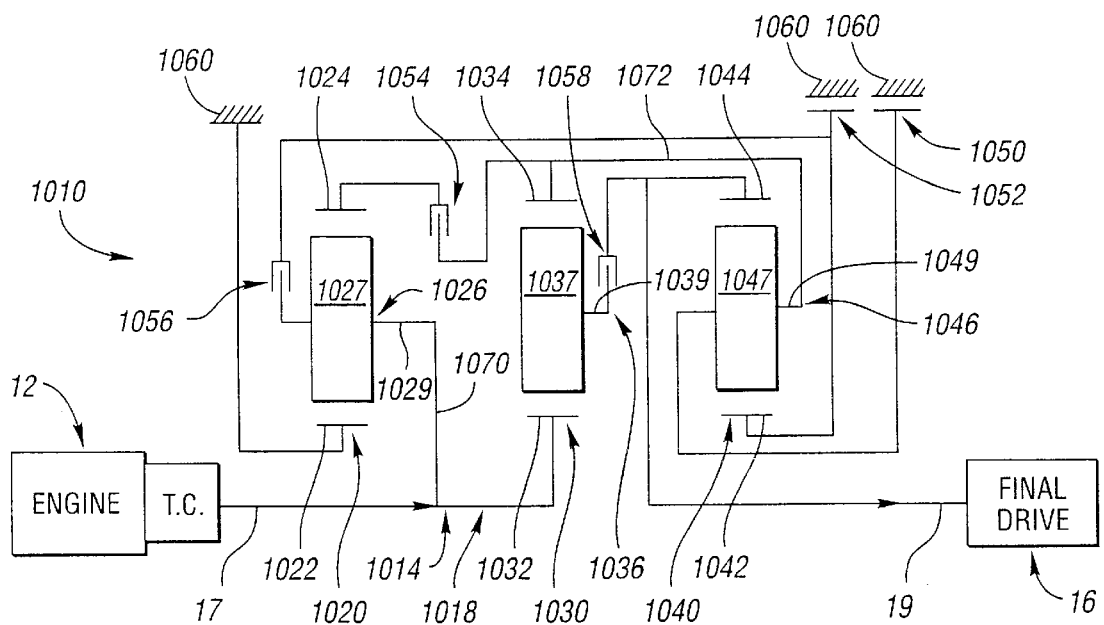

A powertrain 1010, shown in FIG. 11a, includes the conventional engine and torque converter 12, a planetary transmission 1014, and the conventional final drive mechanism 16. The engine and torque converter are drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022, a ring gear member 1024, and a planet carrier assembly 1026. The planet carrier assembly 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the sun gear member 1032 and the ring gear member 1034.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the sun gear member 1042 and the ring gear member 1044.

The planetary gear arrangement 1018 also includes five torque-transmitting mechanisms 1050, 1052, 1054, 1056 and 1058. The torque-transmitting mechanisms 1050 and 1052 are stationary-type torque-transmitting mechanisms, commonly termed brakes or reaction clutches. The torque-transmitting mechanisms 1054, 1056 and 1058 are of the rotating-type torque-transmitting mechanisms, commonly termed clutches.

The input shaft 17 is continuously connected with the planet carrier assembly member 1026, the output shaft 19 is continuously connected with the ring gear member 1044, and the sun gear member 1022 is continuously connected with the transmission housing 1060. The planet carrier assembly member 1026 is continuously connected with the sun gear member 1032 through the interconnecting member 1070. The ring gear member 1034 is continuously connected with the planet carrier assembly member 1046 through the interconnecting member 1072.

The planet carrier assembly member 1046 is selectively connectable with the transmission housing 1060 through the torque-transmitting mechanism 1050. The sun gear member 1042 is selectively connectable with the transmission housing 1060 through the torque-transmitting mechanism 1052. The ring gear member 1024 is selectively connectable with the ring gear member 1034 through the torque-transmitting mechanism 1054. The planet carrier assembly member 1026 is selectively connectable with the sun gear member 1042 through the torque-transmitting mechanism 1056. The planet carrier assembly member 1036 is selectively connectable with the ring gear member 1044 through the torque-transmitting mechanism 1058.

The truth table shown in FIG. 11b describes the engagement combinations and the engagement sequence necessary to provide the reverse drive ratio and the six forward speed ratios. A sample of the numerical values for the ratios is also provided in the truth table of FIG. 11b. These values are determined utilizing the ring gear/sun gear tooth ratios also given in FIG. 11b. The R1/S1 value is the tooth ratio for the planetary gear set 1020; the R2/S2 value is the tooth ratio for the planetary gear set 1030; and the R3/S3 value is the tooth ratio for the planetary gear set 1040. Also given in FIG. 11b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1040. The numerical value of the first forward speed ratio is determined utilizing the ring gear/sun gear tooth ratio of the planetary gear set 1030. The numerical value of the second forward speed ratio is determined utilizing the ring gear/sun gear tooth ratios of the planetary gear sets 1030 and 1040. The third forward speed ratio is a 1:1 or direct drive. The numerical value of the fourth forward speed ratio is determined utilizing the ring gear/sun gear tooth ratios of the planetary gear sets 1020 and 1030. The numerical values of the fifth and sixth forward speed ratios are determined utilizing the ring gear/sun gear tooth ratios of the planetary gear sets 1020 and 1040.

Figures 12A, 12B:
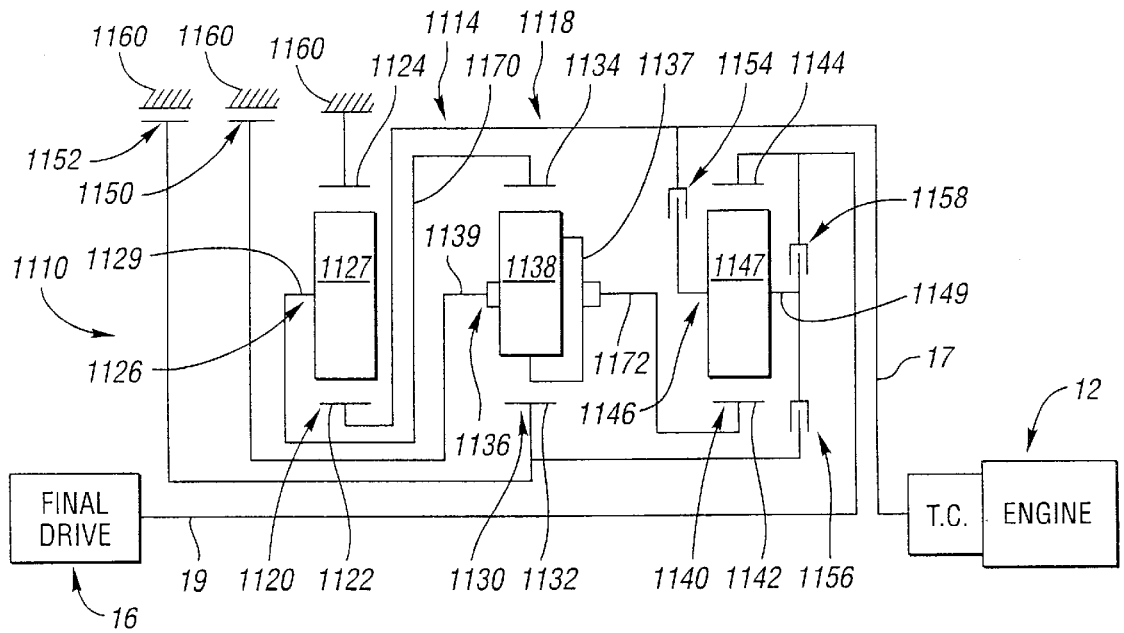

A powertrain 1110, shown in FIG. 12a, has a conventional engine and torque converter 12, a planetary transmission 1114, and the conventional final drive mechanism 16. The planetary transmission 1114 includes a planetary gear arrangement 1118 which is connected with the engine and torque converter 12 through the input shaft 17 and with the final drive mechanism 16 through the output shaft 19. The planetary gear arrangement 1118 includes three planetary gear sets 1120, 1130 and 1140.

The planetary gear set 1120 includes a sun gear member 1122, a ring gear member 1124, and a planet carrier assembly 1126. The planet carrier assembly 1126 includes a plurality of pinion gears 1127 rotatably mounted on a carrier member 1129 and disposed in meshing relationship with both the sun gear member 1122 and the ring gear member 1124.

The planetary gear set 1130 includes a sun gear member 1132, a ring gear member 1134, and a planet carrier assembly member 1136. The planet carrier assembly member 1136 includes a plurality of intermeshing pinion gears 1137 and 1138 that are rotatably mounted on a carrier member 1139 and disposed in meshing relationship with both the sun gear member 1132 and the ring gear member 1134.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear arrangement 1118 also includes five torque-transmitting mechanisms 1150, 1152, 1154, 1156 and 1158. The torque-transmitting mechanisms 1150 and 1152 are stationary-type torque-transmitting mechanisms, commonly termed brakes or reaction clutches. The torque-transmitting mechanisms 1154, 1156 and 1158 are of the rotating-type torque-transmitting mechanisms, commonly termed clutches.

The input shaft 17 is continuously connected with the sun gear member 1122, the output shaft 19 is continuously connected with the ring gear member 1144, and the ring gear member 1124 is continuously connected with the transmission housing 1160. The planet carrier assembly member 1126 is continuously connected with the ring gear member 1134 through the interconnecting member 1170. The planet carrier assembly member 1136 is continuously connected with the sun gear member 1142 through the interconnecting member 1172.

The planet carrier assembly member 1136 is selectively connectable with the transmission housing 1160 through the torque-transmitting mechanism 1150. The sun gear member 1132 is selectively connectable with the transmission housing 1160 through the torque-transmitting mechanism 1152. The planet carrier assembly member 1146 is selectively connectable with the sun gear member 1122 through the torque-transmitting mechanism 1154. The planet carrier assembly member 1146 is selectively connectable with the sun gear member 1132 through the torque-transmitting mechanism 1156. The planet carrier assembly member 1146 is selectively connectable with the ring gear member 1144 through the torque-transmitting mechanism 1158.

The truth table shown in FIG. 12b describes the engagement sequence and engagement combinations utilized with the present family member to provide a reverse drive ratio and six forward speed ratios. The truth table of FIG. 12b also provides a set of example numbers that can be established in the planetary gear arrangement 1118 utilizing the ring gear/sun gear tooth ratios. The R1/S1 value is the ring gear/sun gear tooth ratio of the planetary gear set 1120; the R2/S2 value is the ring gear/sun gear tooth ratio of the planetary gear set 1130; and the R3/S3 value is the ring gear/sun gear tooth ratio of the planetary gear set 1140.

The chart of FIG. 12b describes the ratio steps between adjacent forward speed ratios for a six speed transmission. These step ratios are established utilizing the example speed ratios given in the truth table. As also shown in the truth table, the torque-transmitting mechanism 1156 can remain engaged through the neutral condition, thereby simplifying the forward/reverse interchange.

Those skilled in the art will recognize that the numerical value of the reverse and fourth and sixth forward speed ratios are determined utilizing the ring gear/sun gear tooth ratios of the planetary gear sets 1120, 1130 and 1140. The numerical value of the first forward speed ratio is determined utilizing the ring gear/sun gear tooth ratio of the planetary gear set 1120. The numerical value of the second forward speed ratio is determined utilizing the ring gear/sun gear tooth ratios of the planetary gear sets 1120 and 1130. The third forward speed ratio is a direct drive or 1:1 ratio. The numerical value of the fifth forward speed ratio is determined utilizing the ring gear/sun gear tooth ratio of the planetary gear set 1140.

While the best modes for carrying out the invention have been described in detail, those familiar with the art to which this invention relates will recognize various alternative designs and embodiments for practicing the invention within the scope of the appended claims.

What is claimed is:

1. A transmission comprising:

an input shaft;

an output shaft;

first, second and third planetary gear sets each having first, second and third members;

a first interconnecting member continuously interconnecting said first member of said first planetary gear set and said first member of said second planetary gear set;

a second interconnecting member continuously interconnecting said second member of said second planetary gear set and said first member of said third planetary gear set;

a stationary transmission housing continuously connected with said second member of said first planetary gear set;

said input shaft being continuously interconnected with said first interconnecting member, said third member of said first or second planetary gear set or said second member of said third planetary gear set, said output shaft being continuously interconnected with another of said members that is not continuously interconnected with said input shaft;

a first torque-transmitting mechanism selectively interconnecting said stationary transmission housing with a member of said second or third planetary gear set that is not continuously interconnected with said input shaft or said output shaft;

a second torque-transmitting mechanism selectively interconnecting said stationary transmission housing with said second interconnecting member;

a third torque-transmitting mechanism selectively interconnecting said third member of said first planetary gear set with said second or third member of said second planetary gear set or said second or third member of said third planetary gear set;

a fourth torque-transmitting mechanism selectively interconnecting said third member of said second planetary gear set with said second or third member of said third planetary gear set;

a fifth torque-transmitting mechanism selectively interconnecting said first interconnecting member with said second or third member of said third planetary gear set or said third member of said second planetary gear set, or selectively interconnecting said third member of said third planetary gear set with another member of said third planetary gear set or said third member of said second planetary gear set, said members interconnected by said fifth torque transmitting mechanism being different from the members interconnected by said third or fourth torque transmitting mechanisms; and said torque-transmitting mechanisms being engaged in combinations of two to establish at least six forward speed ratios and a reverse speed ratio between said input shaft and said output shaft.

2. The transmission defined in claim 1, wherein said first and second torque-transmitting mechanisms comprise brakes.

3. The transmission defined in claim 1, wherein said third, fourth and fifth torque-transmitting mechanisms comprise clutches.

4. A transmission comprising:
an input shaft;
an output shaft;
a planetary gear arrangement having first second and third planetary gear sets, each planetary gear set having first, second and third members;
a first interconnecting member continuously interconnecting said first member of said first planetary gear set and said first member of said second planetary gear set;
a second interconnecting member continuously interconnecting said second member of said second planetary gear set and said first member of said third planetary gear set;
a stationary transmission housing continuously connected with said second member of said first planetary gear set; and
said input shaft being continuously interconnected with said first interconnecting member, said third member of said first or second planetary gear set or said second member of said third planetary gear set, said output shaft being continuously interconnected with another one of said members that is not continuously interconnected with said input shaft;

five selectively engageable torque transmitting mechanisms for selectively interconnecting said members of said planetary gear sets with said input shaft, said output shaft, said transmission housing, or another member of one of said planetary gear sets, said torque transmitting mechanisms being engaged in combinations of two to establish at least six forward speed ratios and one reverse speed ratio between said input shaft and said output shaft wherein said five torque transmitting mechanisms are selectively engaged in one of the following combinations:

an engaged combination with said first torque transmitting mechanism selectively interconnecting said stationary transmission housing with said third member of said planetary gear set, said second torque transmitting mechanism selectively interconnecting said stationary transmission housing with said second interconnecting member, said third torque transmitting mechanism selectively interconnecting said third member of said first planetary gear set with said third member of said second planetary gear set, said fourth torque transmitting mechanism selectively interconnecting said third member of said second planetary gear set with said third member of said third planetary gear set, and said fifth torque transmitting mechanism selectively interconnecting said first interconnecting member with said third member of said third planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said second member of said second planetary gear set, said fourth torque transmitting mechanism selectively interconnecting said third member of said second planetary gear set with said third member of said third planetary gear set, and said fifth torque transmitting mechanism selectively interconnecting said third member of said third planetary gear set with said third member of said second planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said third member of said second planetary gear set, said fourth torque transmitting mechanism selectively interconnecting said third member of said second planetary gear set with said second member of said third planetary gear set, and said filth torque transmitting mechanism selectively interconnecting said third member of said third planetary gear set with said third member of said second planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said second member of said third planetary gear set, said fourth torque transmitting mechanism selectively interconnecting said third member of said second planetary gear set with said third member of said third planetary gear set, and said fifth torque transmitting mechanism selectively interconnecting said first interconnecting member with said third member of said second planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said third member of said third planetary gear set, said fourth torque transmitting mechanism selectively interconnecting said third member of said second planetary gear set with said third member of said third planetary gear set and said fifth torque transmitting mechanism selectively interconnecting said first interconnecting member with said third member of said second planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said second member of said second planetary gear set, said fourth torque transmitting mechanism selectively interconnecting said third member of said second planetary gear set with said third member of said third planetary gear set, and said fifth torque transmitting mechanism selectively interconnecting said first interconnecting member with said third member of said third planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said second member of said second planetary gear set, said fourth torque transmitting mechanism selectively interconnecting said third member of said second planetary gear set with said second member of said third planetary gear set, and said fifth torque transmitting mechanism selectively interconnecting said first interconnecting member with said third member of said third planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said third member of said second planetary gear set, said fourth torque transmitting mechanism selectively interconnecting said third member of said second planetary gear set with said third member of said third planetary gear set, and said fifth torque transmitting mechanism selectively interconnecting said first interconnecting member with said second member of said third planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said second member of said second planetary gear set; said fourth torque transmitting mechanism selectively interconnecting said third member of said second planetary gear set with said third member of said third planetary gear set; and said fifth torque transmitting mechanism selectively interconnecting said first interconnecting member with said third member of said third planetary gear set; or an engaged combination with said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said second member of said second planetary gear set, said fourth torque transmitting mechanism selectively interconnecting said third member of said second planetary gear set with said second member of said third planetary gear set, and said fifth torque transmitting mechanism selectively interconnecting said first interconnecting member with said third member of said third planetary gear set; or an engaged combination with said first torque transmitting mechanism selectively interconnecting said stationary transmission housing with said third member of said second planetary gear set, said second torque transmitting mechanism selectively interconnecting said stationary transmission housing with said second interconnecting member, said third torque transmitting mechanism selectively interconnecting said third member of said first planetary gear set with said third member of said third planetary gear set, said fourth torque transmitting mechanism selectively interconnecting said third member of said second planetary gear set with said third member of said third planetary gear set, and said fifth torque transmitting mechanism selectively interconnecting said third member of said third planetary gear set with said second member of said third planetary gear set.

5. The transmission in claim 4, wherein planet carrier assembly members of each of said planetary gear sets are single-pinion carriers.

6. The transmission in claim 4, wherein at least one planet carrier assembly member of said planetary gear sets is a double-pinion type carrier.

7. A transmission comprising:

an input shaft;

an output shaft;

a planetary gear arrangement having first, second and third planetary gear sets, each planetary gear set having first, second and third members;

a first interconnecting member continuously interconnecting said first member of said first planetary gear set and said first member of said second planetary gear set;

a second interconnecting member continuously interconnecting said second member of said second planetary gear set and said first member of said third planetary gear set;

a stationary transmission housing continuously connected with said second member of said first planetary gear set; and said input shaft being continuously interconnected with said first interconnecting member, said third member of said first planetary gear set or said third member of said second planetary gear set, said output shaft being continuously interconnected with said second member of said third planetary gear set;

five selectively engageable torque transmitting mechanisms for selectively interconnecting said members of said planetary gear sets with said input shaft, said output shaft, said transmission housing, or another member of one of said planetary gear sets, said torque transmitting mechanisms being engaged in combinations of two to establish at least six forward speed ratios and one reverse speed ratio between said input shaft and said output shaft wherein said five torque transmitting mechanisms are selectively engaged in the following combination:

said first torque transmitting mechanism selectively interconnecting said stationary transmission housing with said third member of said third planetary gear set, said second torque transmitting mechanism selectively interconnecting said stationary transmission housing with said second interconnecting member, said third torque transmitting mechanism selectively interconnecting said third member of said first planetary gear set with said third member of said second planetary gear set, said fourth torque transmitting mechanism selectively interconnecting said third member of said second planetary gear set with said third member of said third planetary gear set, and said fifth torque transmitting mechanism selectively interconnecting said first interconnecting member with said third member of said third planetary gear set.

* * * * *